US012479013B2

(12) United States Patent
Effrick, Jr. et al.

(10) Patent No.: US 12,479,013 B2
(45) Date of Patent: Nov. 25, 2025

(54) TOOLING ASSEMBLY FOR CLEANING A CYLINDER HEAD USING PRESSURIZED FLUID AND A METHOD FOR THE SAME

(71) Applicant: Fives Cinetic Corp., Farmington Hills, MI (US)

(72) Inventors: Michael Effrick, Jr., Howell, MI (US); Jakub John, London (CA); Thomas Brock, Clarkston, MI (US); Steven Richardson, Windsor (CA)

(73) Assignee: Fives Cinetic Corp., Farmington Hills, MI (US)

( * ) Notice: Subject to any disclaimer, the term of this patent is extended or adjusted under 35 U.S.C. 154(b) by 92 days.

(21) Appl. No.: 18/322,173

(22) Filed: May 23, 2023

(65) Prior Publication Data

US 2024/0390956 A1 Nov. 28, 2024

(51) Int. Cl.
*B08B 9/032* (2006.01)
*B08B 9/043* (2006.01)

(52) U.S. Cl.
CPC .......... *B08B 9/0322* (2013.01); *B08B 9/0325* (2013.01); *B08B 9/0433* (2013.01); *B08B 9/0326* (2013.01)

(58) Field of Classification Search
CPC ........................................................ F02B 77/04
See application file for complete search history.

(56) References Cited

U.S. PATENT DOCUMENTS 2,720,057 A * 10/1955 Pyciak .................... F02B 77/04 451/102
12,196,123 B1 * 1/2025 Trudeau .................. F02B 19/12

FOREIGN PATENT DOCUMENTS

| | | | | |
|---|---|---|---|---|
| EP | 1882837 | A2 | 1/2008 | |
| EP | 2228136 | A2 * | 9/2010 | ............... B05B 1/14 |
| EP | 3199253 | A1 | 8/2017 | |
| KR | 20160096930 | A | 8/2016 | |

OTHER PUBLICATIONS

Machine translation: Von Linde; EP2228136 (Year: 2010).*
Extended European Search Report in corresponding European Patent Application No. EP24159120.5; dated Sep. 11, 2024; 7 pages.

* cited by examiner

*Primary Examiner* — Natasha N Campbell
(74) *Attorney, Agent, or Firm* — Quinn IP Law

(57) ABSTRACT

A method of cleaning a cylinder head using pressurized fluid and a tooling assembly for the same includes a jet ignition insert attached to a spark plug well defined by the cylinder head. The insert defines an opening in fluid communication with the spark plug well. The insert includes an end wall attached to the insert distal end to close one end of the opening and the end wall defines holes. The tooling assembly includes a tool configured to clean the insert. A first engagement surface of the insert and a second engagement surface of the tool engage each other to form a seal that surrounds the holes of the insert such that the pressurized fluid is directed through the holes and into the opening of the insert during the first operation procedure of the tooling assembly to flush debris out of the holes of the insert.

15 Claims, 15 Drawing Sheets

TOOLING ASSEMBLY FOR CLEANING A CYLINDER HEAD USING PRESSURIZED FLUID AND A METHOD FOR THE SAME

BACKGROUND

Many parts, such as engine blocks, cylinder heads, manifolds, housings, etc., are machined, finished, etc., which may form debris that remains in the parts. Therefore, many parts require one or more different cleaning operations to be performed during their manufacture in preparation for installation. For example, an engine block may have many different ports, passages, galleries, etc., which must have several different cleaning operations performed on each. However, some cylinder heads define a pre-combustion chamber, and the pre-combustion chamber may be challenging to clean debris out of.

SUMMARY

Generally, it is desirable to develop a tooling assembly and a method to clean a pre-combustion chamber of a cylinder head.

The present disclosure provides a tooling assembly for cleaning a cylinder head using pressurized fluid. The tooling assembly includes a jet ignition insert attached to a spark plug well defined by the cylinder head. The jet ignition insert includes an insert proximal end and an insert distal end. The jet ignition insert defines an opening that extends between the insert proximal end and the insert distal end. The opening is in fluid communication with the spark plug well. The jet ignition insert includes an end wall attached to the insert distal end to close one end of the opening. The end wall includes a face disposed outside of the spark plug well. The end wall defines a plurality of holes in fluid communication with the opening. The holes intersect the face such that outside of the jet ignition insert is in fluid communication with the opening inside of the jet ignition insert. The face includes a first engagement surface that surrounds the holes. The tooling assembly includes a tool configured to clean the jet ignition insert. The tool includes a first tool attachment having a first tool housing that extends between a tool distal end and a tool proximal end relative to a first central axis. The first tool housing defines a through-hole along the first central axis and the through-hole intersects the tool distal end and the tool proximal end to define respective open ends. The tool distal end includes a second engagement surface that surrounds the through-hole. The first engagement surface of the jet ignition insert and the second engagement surface of the tool engage each other during a first operation procedure of the tooling assembly to form a seal that surrounds the holes of the jet ignition insert such that the pressurized fluid is directed through the holes and into the opening of the jet ignition insert during the first operation procedure of the tooling assembly to flush debris out of the holes of the jet ignition insert.

The present disclosure also provides a method of cleaning a cylinder head using pressurized fluid. A first tool attachment is attached to a tool to perform a first operation procedure. A first engagement surface of a jet ignition insert and a second engagement surface of the first tool attachment are abutted together to form a seal therebetween during the first operation procedure. The jet ignition insert caps an end of a spark plug well. The jet ignition insert includes an insert proximal end and an insert distal end. The jet ignition insert defines an opening extending between the insert proximal end and the insert distal end. The opening is in fluid communication with the spark plug well. The jet ignition insert includes an end wall attached to the insert distal end to close one end of the opening. The end wall includes a face disposed outside of the spark plug well. The end wall defines a plurality of holes in fluid communication with the opening, and the holes intersect the face such that outside of the jet ignition insert is in fluid communication with the opening inside of the jet ignition insert. The face includes the first engagement surface that surrounds the holes. A flow of a pressurized fluid is directed through the tool and through the holes of the end wall of the jet ignition insert to flush debris out of the holes of the end wall and toward the opening of the jet ignition insert during the first operation procedure. The flow of the pressurized fluid is stopped and the tool is retracted away from the jet ignition insert to complete the first operation procedure. The first tool attachment is removed from the tool when the first operation procedure is complete. A second tool attachment is attached to the tool to perform a second operation procedure. The second tool attachment is inserted in a first direction inside of the spark plug well and into a first portion of the opening of the jet ignition insert until an end of the second tool attachment is disposed proximal to a second portion of the opening of the jet ignition insert during the second operation procedure. A flow of a pressurized fluid is directed through the second tool attachment of the tool and into the opening of the jet ignition insert during the second operation procedure. The second tool attachment is moved in a second direction outwardly away from the jet ignition insert through the spark plug well as the pressurized fluid is flowing through the tool to flush the debris out of the opening of the jet ignition insert and out of the spark plug well during the second operation procedure.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
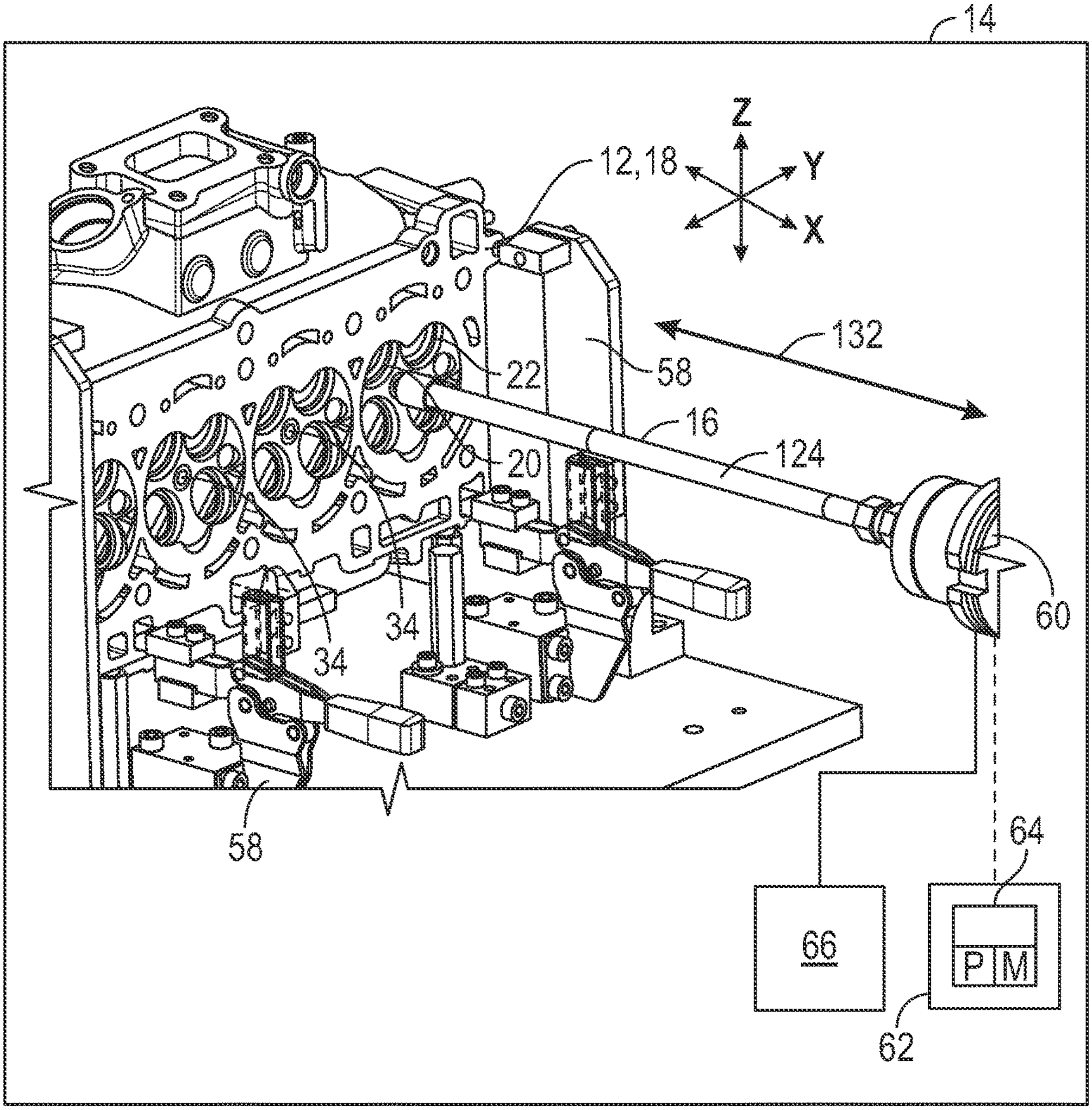
FIG. 1 is a schematic illustration of a part cleaning machine.
Figure 13:
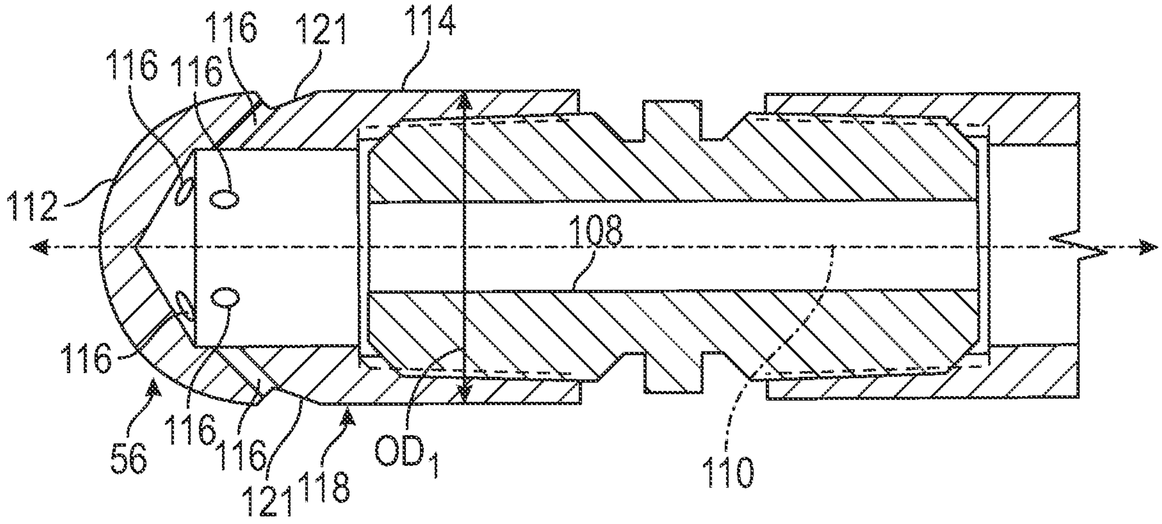
FIG. 13 is a schematic cross-sectional view of the second tool attachment of FIG. 11.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, a tooling assembly 10 for cleaning a cylinder head 12 using pressurized fluid is generally shown in FIG. 1.

The tooling assembly 10 may be controlled via a part cleaning machine 14. The part cleaning machine 14 may choose from several different tool attachments, some of which include tool attachments 54, 56, for performing several different cleaning operations. As such, the cylinder head 12 does not have to be moved between different stations for different cleaning operations.

The part cleaning machine 14 may be used to perform several different cleaning operations on a part, such as the cylinder head 12. The different cleaning operations may include, but are not limited to, deburring, washing, flushing, drying, etc. The part may include, but is not limited to, any article of manufacture that requires a cleaning operation be performed on that part for preparation for future assembly or other manufacturing processes. For example, the part may include, but is not limited to, an engine block, the cylinder head 12, a manifold, or some cast or machined part. The part cleaning machine 14 is capable of performing several different cleaning operations, and may be programmed for cleaning several different parts. Accordingly, a single part cleaning machine 14 may perform several different cleaning operations on several different parts, without having to move the part between different cleaning stations.

The below discussion focuses on the part being the cylinder head 12, as the tooling assembly 10 and method described herein is tailored to cleaning a particular location of the cylinder head 12. However, it is to be appreciated that the tooling assembly 10 and method described herein may be used to clean other parts besides the cylinder head 12.

Generally, each of the different cleaning operations, i.e., deburring, washing, flushing, drying, etc., may require a tool 16 that is specialized for performing a specific cleaning operation in a specific location of the part. The tool 16 may include, but is not limited to, several different configurations of nozzles, lances, brushes, manifolds, spin jets, or seal and flush devices. Therefore, for example, the tool 16 may have several different tool attachments 54, 56 for performing different cleaning operations, some of which are discussed further below.

Turning back to the cylinder head 12, the cylinder head 12 is part of an internal combustion engine. The cylinder head 12 is attached to an engine block, and generally, sits above cylinders of the engine block. Pistons are movably disposed in respective cylinders in response to combustion. The cylinder head 12 closes a top of the engine block, and specifically close a top of the cylinders, to form a combustion chamber therebetween.

Figure 2:
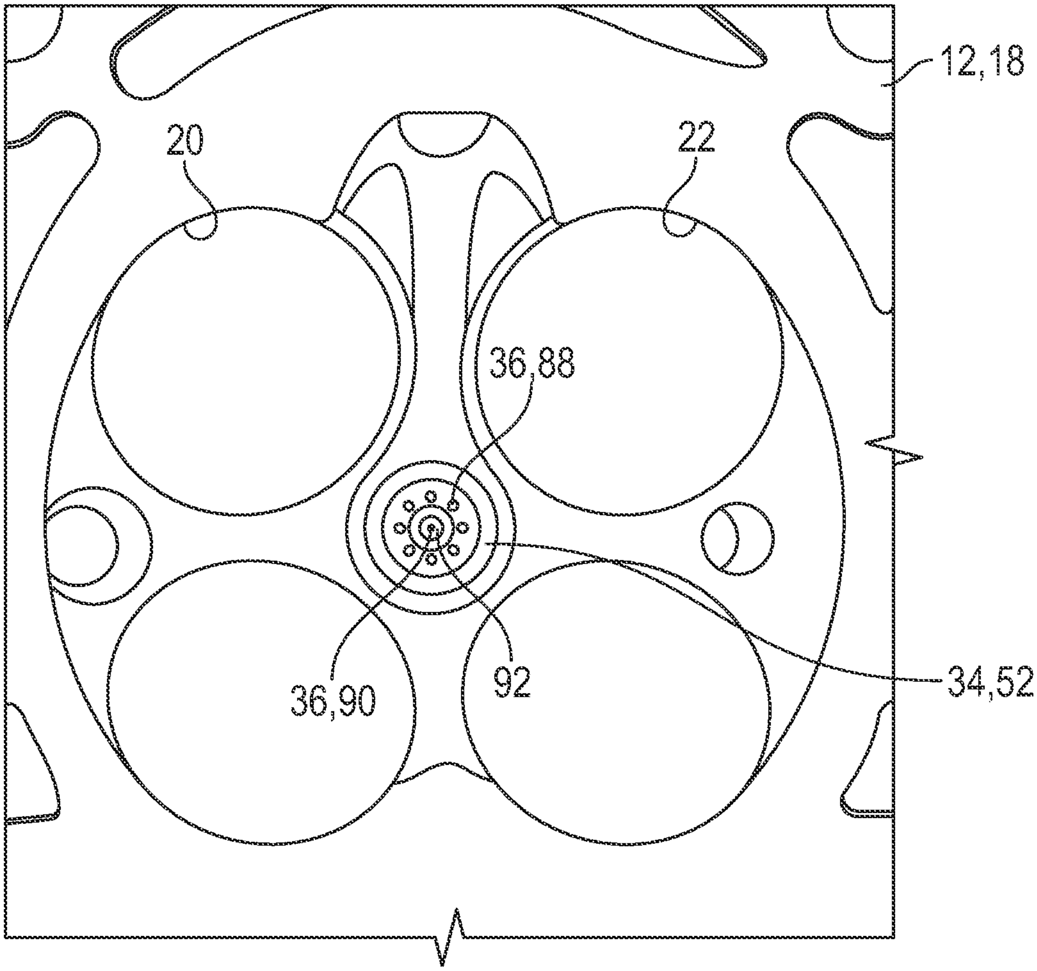
FIG. 2 is a schematic plan view of a cylinder head and an end of a jet ignition insert.

Referring to FIGS. 1 and 2, the cylinder head 12 may include a body 18 defining at least one inlet passage 20 and at least one outlet passage 22. A valve is movable disposed in each inlet passage 20 and in each outlet passage 22 to selectively allow air intake into the combustion chamber via the inlet passage 20, and expel exhaust gasses out of the combustion chamber via the outlet passage 22.

Figure 3:
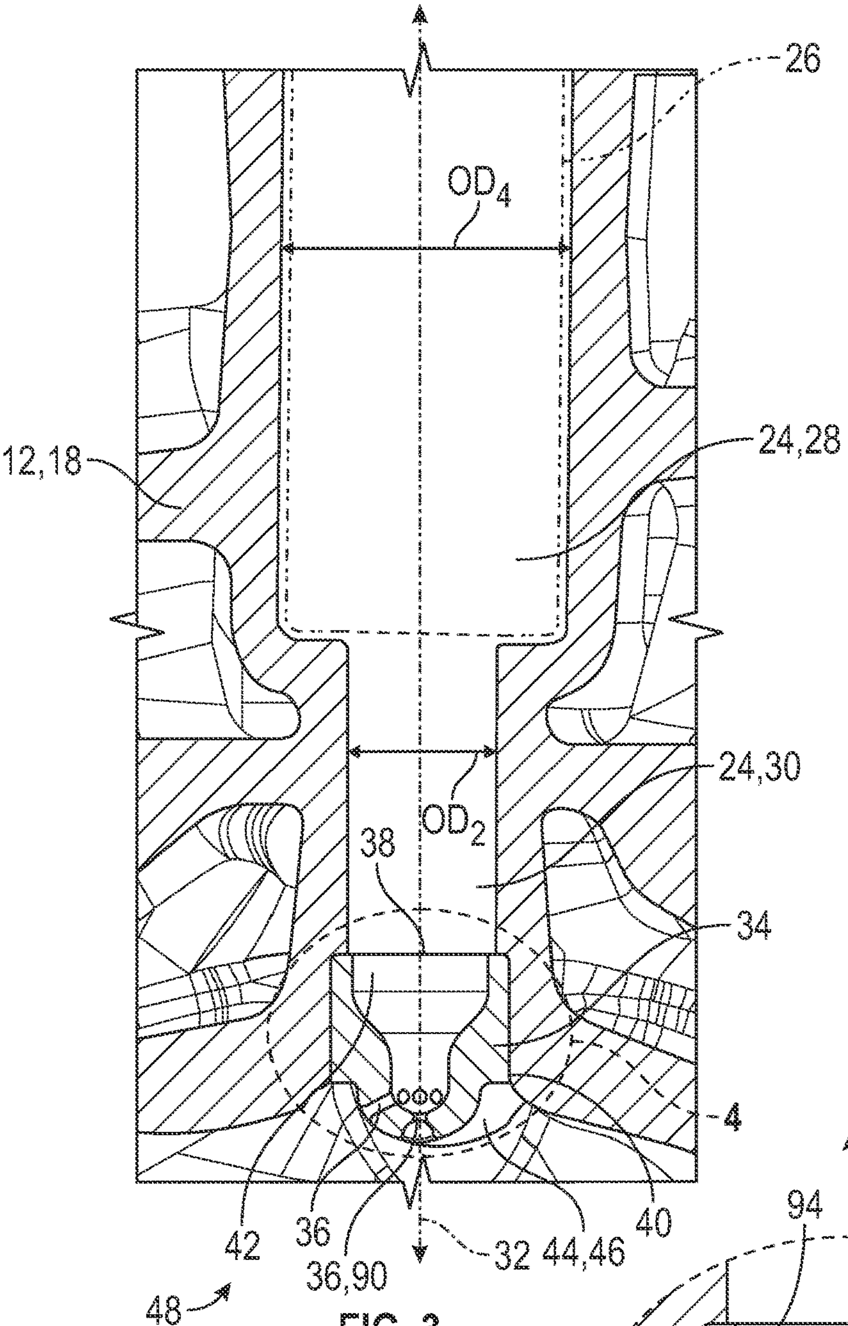
FIG. 3 is a schematic cross-sectional view of the cylinder head and the jet ignition insert.

Referring to FIG. 3, the body 18 may also define a spark plug well 24. The spark plug well 24 is disposed between the at least one inlet passage 20 and the at least one outlet passage 22. A spark plug 26 is disposed in the spark plug well 24, and selectively provides spark to cause combustion in the combustion chamber. The spark plug 26 may be fixed to the cylinder head 12 inside of the spark plug well 24. Therefore, generally, the cylinder head 12 defines the spark plug well 24 and supports the spark plug 26.

Continuing with FIG. 3, the spark plug well 24 defines a first well portion 28 and a second well portion 30 disposed adjacent to each other along a longitudinal axis 32. Generally, the second well portion 30 is disposed between the first well portion 28 and the combustion chamber. The first well portion 28 houses the spark plug 26, and the spark plug 26 includes an electrode that is disposed adjacent to, or at least partially inside of, the second well portion 30. Therefore, the second well portion 30 may be referred to as a pre-combustion chamber. Fuel may be injected into the pre-combustion chamber which then enters the combustion chamber through a jet ignition insert 34. In certain configurations, the jet ignition insert 34 is a turbulent jet ignition (TJI) insert 34. Turbulent jet ignition refers to a technique that discharges gases (such as hot gases) and/or injects fuel into the pre-combustion chamber to initiate combustion. That is, a jet of gases may be injected into the pre-combustion chamber, which creates turbulent fluid motion inside of the pre-combustion chamber. Therefore, the TJI insert 34 may be the insert 34 that closes an end of the pre-combustion chamber in which the turbulent jet ignition technique may occur.

Generally, the jet ignition insert 34 is fixed to the body 18 to cap the spark plug well 24. In other words, the jet ignition insert 34 is attached to the spark plug well 24 defined by the cylinder head 12. More specifically, the jet ignition insert 34 caps an end of the second well portion 30, or the pre-combustion chamber. Therefore, the jet ignition insert 34 is fixed to the second well portion 30, or the pre-combustion chamber. The jet ignition insert 34 may be attached to the cylinder head 12 by any suitable ways, and one non-limiting example, is a press fit.

Figure 4:
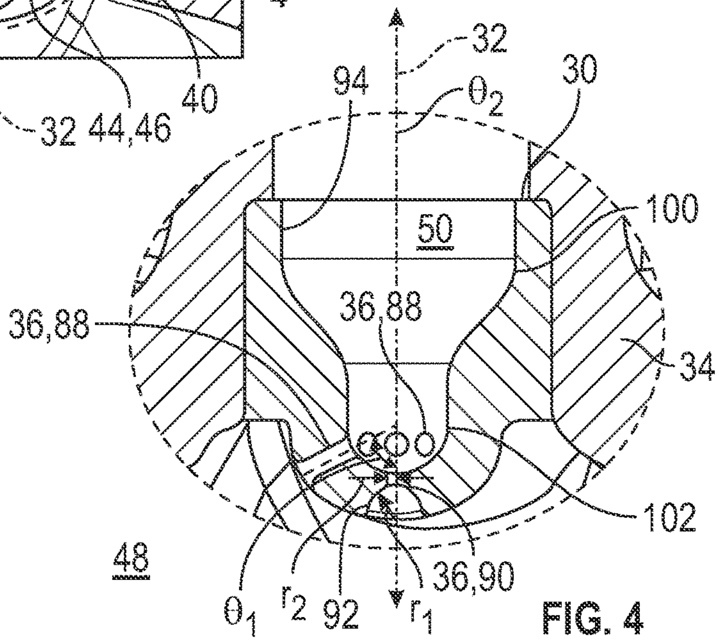
FIG. 4 is a schematic enlarged cross-sectional view of the jet ignition insert taken from line 4 of FIG. 3.

Also referring to FIG. 4, the jet ignition insert 34 defines a plurality of holes 36 in fluid communication with the combustion chamber. Therefore, fuel injected into the pre-combustion chamber exits the pre-combustion chamber via the holes 36 of the jet ignition insert 34, and then enters the combustion chamber, where ignition of the fuel via spark from the spark plug 26 mainly occurs. Therefore, for the TJI insert 34, the jet of gases may be injected into the pre-combustion chamber to create turbulent fluid motion therein and the gases and/or the fluid exit through the holes 36 to enter the combustion chamber where ignition mainly occurs. It is to be appreciated that some ignition of the fuel may occur in the pre-combustion chamber, but the primary ignition of the fuel occurs in the combustion chamber.

For the manufacturing of the jet ignition insert 34, the holes 36 of the jet ignition insert 34 may be formed by machining. The holes 36 of the jet ignition insert 34 are small, and thus, debris may remain on the jet ignition insert 34 after machining the holes 36 or other processes for manufacturing the jet ignition insert 34. It is desirable to remove the debris from the jet ignition insert 34 before final assembly of the internal combustion engine because any debris left from the manufacturing process may affect ignition, and thus, performance of the internal combustion engine. Due to the small size of the holes 36, cleaning the debris out of the jet ignition insert 34 may be challenging. Therefore, the tooling assembly 10 described herein is designed to remove the debris from the jet ignition insert 34.

Figure 5:
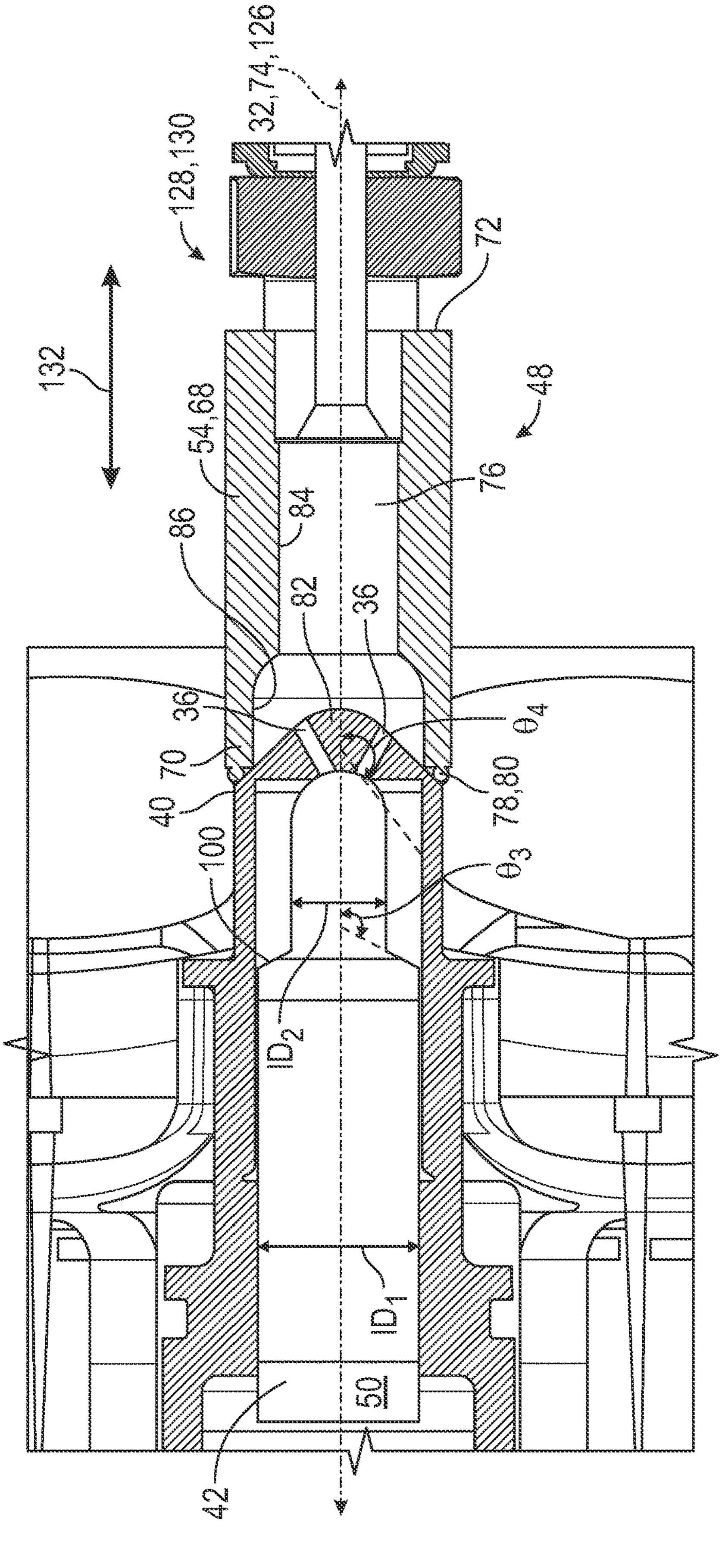
FIG. 5 is a schematic cross-sectional view of a first tool attachment abutting the jet ignition insert to perform a first operation procedure.
Figure 6:
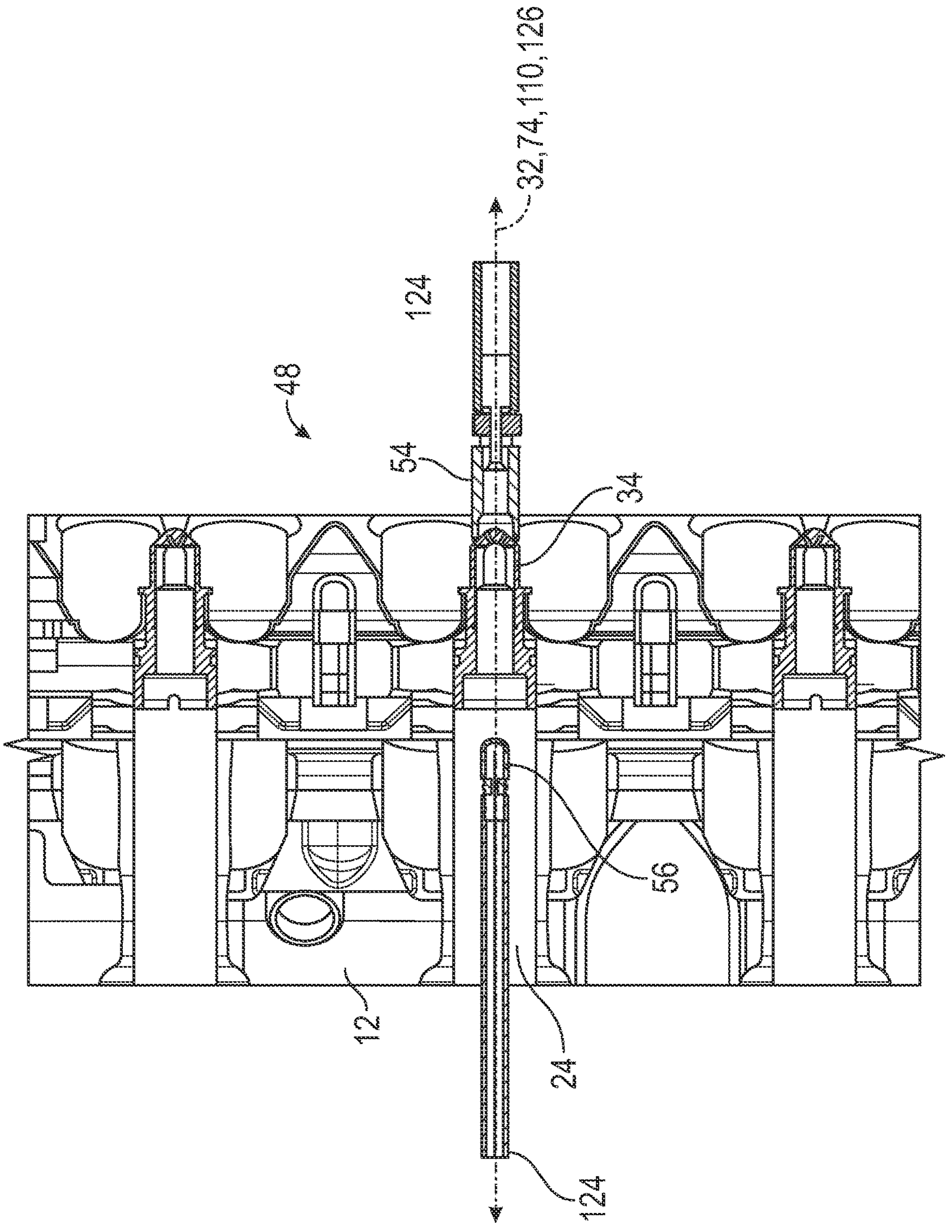
FIG. 6 is a schematic cross-sectional view of the cylinder head illustrating the first tool attachment disposed relative to one side of the cylinder head and a second tool attachment disposed relative to another side of the cylinder head.

Turning to FIG. 5, the jet ignition insert 34 includes an insert proximal end 38 and an insert distal end 40. The jet ignition insert 34 also defines an opening 42 extending between the insert proximal end 38 and the insert distal end 40, and the opening 42 is in fluid communication with the spark plug well 24. More specifically, the opening 42 of the jet ignition insert 34 is in fluid communication with the pre-combustion chamber, or the second well portion 30. As best shown in FIG. 6, the opening 42 may be disposed along the longitudinal axis 32, and thus, the spark plug well 24 and the opening 42 generally align with each other. The jet ignition insert 34 is open to the spark plug well 24, via the opening 42, from the insert proximal end 38.

Referring to FIGS. 4 and 5, the jet ignition insert 34 also includes an end wall 44 attached to the insert distal end 40 to close one end of the opening 42. The end wall 44 includes a face 46 disposed outside 48 of the spark plug well 24. That is, the face 46 faces away from the spark plug well 24. In certain configurations, the end wall 44 of the jet ignition insert 34 defines the holes 36 in fluid communication with the opening 42. That is, the holes 36 intersect the face 46 such that outside 48 of the jet ignition insert 34 is in fluid communication with the opening 42 inside 50 of the jet ignition insert 34. In certain configurations, the face 46 includes a first engagement surface 52 that surrounds the holes 36. Therefore, the first engagement surface 52 of the jet ignition insert 34 faces outwardly away from the spark plug well 24 such that the first engagement surface 52 is exposed outside 48 of the body 18.

During operation of the assembled internal combustion engine, the fuel may exit the jet ignition insert 34 via the holes 36 through the end wall 44 and enter the combustion chamber. Therefore, it is desirable to clean the holes 36, as well as clean the opening 42 of the jet ignition insert 34 prior to assembling the internal combustion engine.

For the cleaning process, both ends of the jet ignition insert 34 are accessible. That is, the cleaning process may be performed from outside 48 of the jet ignition insert 34 through the face 46 of the end wall 44. Additionally, the cleaning process may be performed from inside 50 of the jet ignition insert 34, by entering the cylinder head 12 through the spark plug well 24 to reach the jet ignition insert 34, and inside 50 of the end wall 44. That is, as best shown in FIG. 6, opposing sides of the cylinder head 12 are accessible to clean the jet ignition insert 34. FIG. 6 is used to illustrate where the difference cleaning processes occur as compared to each other, and it is to be appreciated that the two illustrated processes may occur simultaneously or the two illustrated processes may occur one after the other.

The tooling assembly 10 also includes the tool 16 configured to clean the jet ignition insert 34. As discussed above, the tool 16 may have different tool attachments 54, 56 for performing several different cleaning operations. For example, the tool 16 may include a first tool attachment 54 and a second tool attachment 56 interchangeable with the first tool attachment 54. Generally, the first tool attachment 54 is used to perform a first operation procedure and the second tool attachment 56 is used to perform a second operation procedure of the tooling assembly 10. In addition, the second tool attachment 56 is configured differently from the first tool attachment 54. That is, the first tool attachment 54 is formed of a first configuration and the second tool attachment 56 is formed of a second configuration different from the first configuration. The different configurations of the first tool attachment 54 (see FIGS. 5 and 6) and the second tool attachment 56 (see FIGS. 5 and 7) are best shown by comparing the tool attachments 54, 56 of FIG. 6, and the features of each will be discussed below. The first tool attachment 54 and the second tool attachments 56 may have different nozzle configurations.

Turning back to FIG. 1, the part cleaning machine 14 is used to perform the first operation procedure and the second operation procedure. The tool 16 is attached to the part cleaning machine 14, and the part cleaning machine 14 controls the tool 16 to perform the desired procedure, such as cleaning the jet ignition insert 34. The part cleaning machine 14 may include a part holder 58 that supports the part during the cleaning procedure, and the part holder 58 may be rotatable to turn the part to a desired orientation to perform the cleaning procedure. The part cleaning machine 14 may include a tool chuck 60 that supports the tool 16, and the tool 16 is releasably attached to the tool chuck 60.

The part cleaning machine 14 includes a machine controller 62 that is operatively connected and configured to control the part holder 58 and the tool 16, as well as control any other component of the part cleaning machine 14, whether specifically mentioned or not. The machine controller 62 controls the various operations of the part cleaning machine 14 in order to transfer a selected tool 16 to and from the tool chuck 60, and perform a desired cleaning operation.

The machine controller 62 may include a control module 64, such as but not limited to a computer or control unit, to control the operation of the components of the part cleaning machine 14. The machine controller 62 may include a computer and/or a processor P, and include all software, hardware, memory M, algorithms, connections, sensors, etc., necessary to manage and control the operation of the part cleaning machine 14. As such, the first operation procedure and the second operation procedure, as described herein, may be embodied as a program operable on the machine controller 62. It should be appreciated that the machine controller 62 may include any device capable of analyzing data from various sensors, comparing data, making the necessary decisions required to control the operation of the part cleaning machine 14, and executing the required tasks necessary to control the operation of the part cleaning machine 14. In certain configurations, the control module 64 is configured to perform computer numerical control (CNC), and thus, the part cleaning machine 14 may be a CNC machine.

The machine controller 62 may be embodied as one or multiple digital computers or host machines each having one or more processors P and memory M, including one or more of read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The machine controller 62 includes tangible, non-transitory memory on which are recorded computer-executable instructions, including a control algorithm. The processor of the controller is configured for executing the control algorithm. The control algorithm implements a method of operating the part cleaning machine 14 and/or a method of cleaning the cylinder head 12, described herein. More specifically, the machine controller 62 may be operable to select the tool 16 appropriate for performing a desired cleaning operation; transfer the selected tool 16 to the tool chuck 60 before starting the desired cleaning operation; position the selected tool 16 in a pre-defined tool cleaning position by moving the tool chuck 60 along at least one of a Y axis Y and a Z axis Z on a tool positioning plane; position the part in a pre-defined part cleaning position by moving the part holder 58 along a X axis X or rotating the part holder 58; perform the desired cleaning operation on the part; transfer or disconnect the selected tool 16 from the tool chuck 60 after the desired cleaning operation is complete.

The part cleaning machine 14 may include a fluid source 66 that is disposed in fluid communication with the tool chuck 60. The fluid source 66 is used to provide or deliver a fluid to the tool chuck 60, and more specifically to the tool 16. The fluid source 66 may include any equipment necessary to supply the fluid to the tool chuck 60, including all pumps, lines, connections, fittings, tanks, etc. The fluid may include any fluid necessary to perform a desired cleaning operation. For example, the fluid may include, but is not limited to, water, solvents, degreasers, air, coolants, etc., or combinations thereof. Depending upon the desired cleaning operation being performed, the tool 16 may receive the fluid from the tool chuck 60, and dispense the fluid onto the part during the cleaning operation. Accordingly, at least one tool 16 and respective tool attachment 54, 56 is operable to receive the fluid through the tool chuck 60 when attached to the tool chuck 60, and dispense the fluid onto the part. It should be appreciated that the part cleaning machine 14 may optionally include multiple different fluid sources 66, with each selectively providing a different fluid to the tool chuck 60 as needed to perform a desired cleaning operation.

The fluid source 66 delivers the fluid in the desired pressure, and therefore, the below discussion will refer to the fluid as the pressurized fluid. The pressurized fluid that is used for the first operation procedure and the second operation procedure may be any of the fluids discussed above. It is desirable to apply a certain amount of fluid pressure and a certain amount of flow of fluid in order to expel the debris from the jet ignition insert 34. For example, the flow of fluid directed out of the tool 16 is sufficient to create a minimum velocity of fluid through each of the holes 36 of the jet injection insert 34 to remove the debris. As another example, the flow of fluid and the pressure of the fluid directed out of the tool 16 is sufficient to produce an impingement force on the inside 50 of the jet ignition insert 34 and the surface of the spark plug well 24 to remove the debris. One non-limiting example is directing the flow of the pressurized fluid at about 250 pounds per square inch (PSI) and at about 55 gallons per minute (GPM) out of the first tool attachment 54 to flush the debris out of the holes 36 of the jet ignition insert 34. Similarly, another non-limiting example is directing the flow of the pressurized fluid at about 250 PSI and at about 55 GPM out of the second tool attachment 56 to flush the debris out of the opening 42 of the jet ignition insert 34.

Furthermore, the flow (GPM) and the pressure (PSI) may be changed depending on the geometry of the jet ignition insert 34, and specifically, changes to the diameter of the holes 36 of the jet ignition insert 34 and/or changes to the configuration of the spark plug well 24. Therefore, for example, directing the flow of fluid through the through-hole 76 of the first tool attachment 54 may create the minimum velocity of fluid through each of the holes 36 of about 260 meters per second and the pressure of the fluid of about 230 PSI or greater to remove the debris. As another example, directing the flow of fluid through each of the apertures 116 of the second tool attachment 56 may produce the impingement force of about 14 Newtons on the surface inside of jet ignition insert 34 and the surface inside of the spark plug well 24 to remove the debris.

Figure 8:
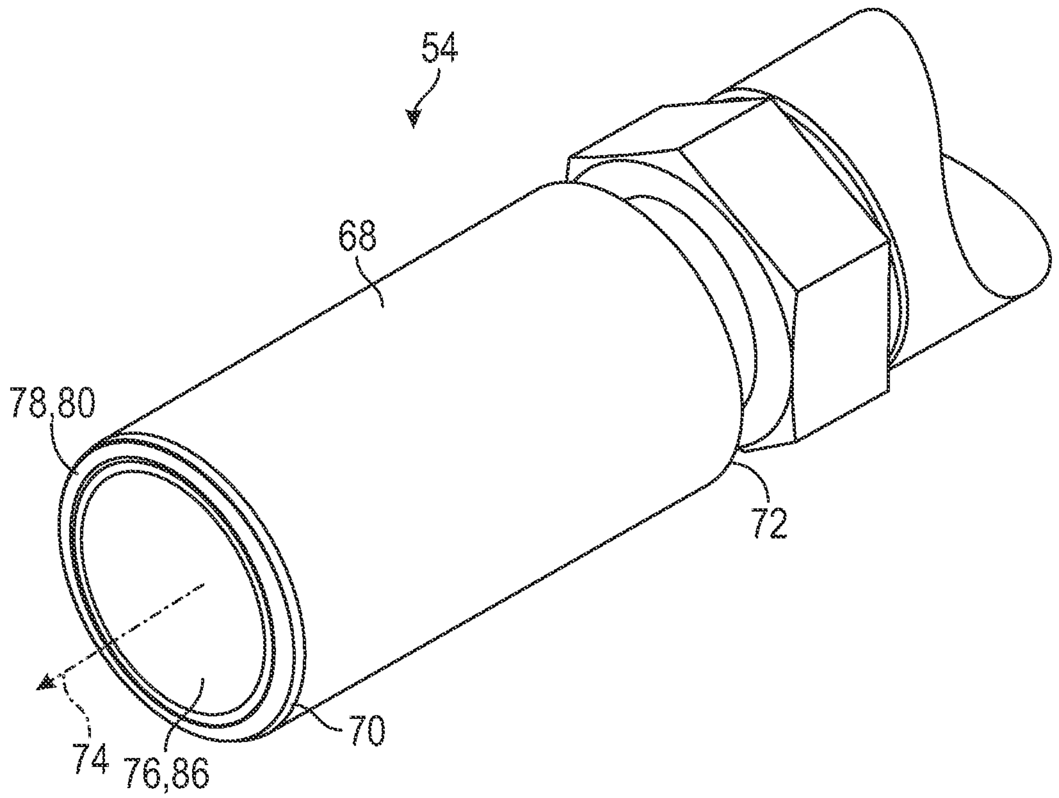
FIG. 8 is a schematic perspective view of the first tool attachment.
Figure 9:
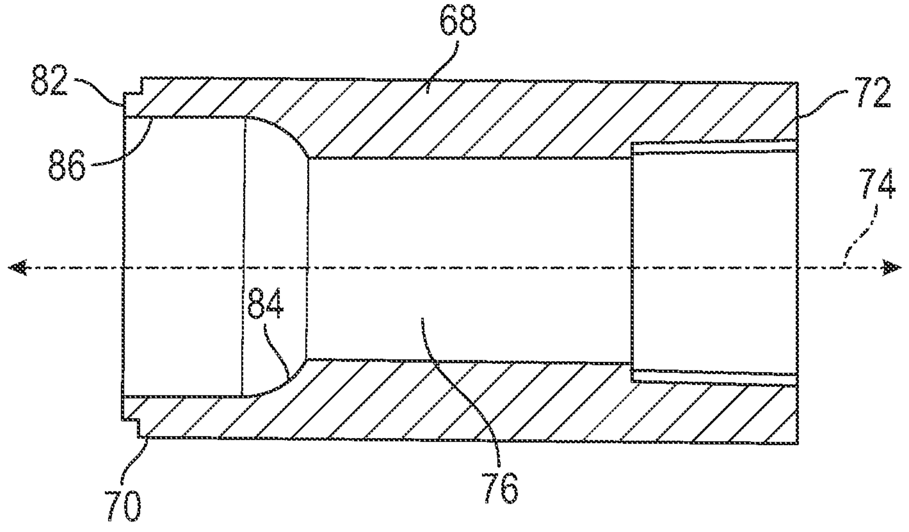
FIG. 9 is a schematic cross-sectional view of the first tool attachment.

Next, the features of the first tool attachment 54 will be discussed with reference to FIGS. 5, 8 and 9. The tool 16 includes the first tool attachment 54 having a first tool housing 68 that extends between a tool distal end 70 and a tool proximal end 72 relative to a first central axis 74. The first tool housing 68 defines a through-hole 76 along the first central axis 74 and the through-hole 76 intersects the tool distal end 70 and the tool proximal end 72 to define respective open ends. The tool distal end 70 includes a second engagement surface 78 that surrounds the through-hole 76. Optionally, the second engagement surface 78 may include a lip 80 or a seal to prevent the pressurized fluid from leaking out between the first engagement surface 52 and the second engagement surface 78 when the tool distal end 70 abuts the face 46 of the end wall 44 of the jet ignition insert 34. The lip 80 may be configured of polymer having rigid properties or any other suitable rigid material that does not flex or bend like a rubber material in order to prevent the pressurized fluid from exiting between the first engagement surface 52 and the second engagement surface 78 during the first operation procedure.

Referring to FIG. 5, the first engagement surface 52 of the jet ignition insert 34 and the second engagement surface 78 of the tool 16 engage each other during the first operation procedure of the tooling assembly 10 to form a seal that surrounds the holes 36 of the jet ignition insert 34 such that the pressurized fluid is directed through the holes 36 and into the opening 42 of the jet ignition insert 34 during the first operation procedure of the tooling assembly 10 to flush debris out of the holes 36 of the jet ignition insert 34. The second engagement surface 78 of the first tool attachment 54 is positioned to align with the first engagement surface 52 of the jet ignition insert 34 outside 48 of the body 18 to perform the first operation procedure. Therefore, the first central axis 74 and the longitudinal axis 32 may align coaxially when the first engagement surface 52 and the second engagement surface 78 abut with each other.

In certain configurations, the end wall 44 of the jet ignition insert 34 protrudes outwardly away from the spark plug well 24 to define a protrusion 82. In this configuration, the first engagement surface 52 surrounds the protrusion 82, and the holes 36 are defined through the protrusion 82.

The first tool attachment 54 is designed to fit around the end wall 44 of the jet ignition insert 34 to seal the tool 16 to the end wall 44. The first tool attachment 54 includes an inner surface 84 defining a boundary of the through-hole 76. The inner surface 84 defines a first pocket 86 presenting a space larger than the protrusion 82. The second engagement surface 78 of the first tool attachment 54 surrounds the first pocket 86. The protrusion 82 is contained inside of the first pocket 86 and spaced apart from the inner surface 84 of the first tool attachment 54 when the first engagement surface 52 of the jet ignition insert 34 and the second engagement surface 78 of the first tool attachment 54 engage each other during the first operation procedure of the tooling assembly 10. Therefore, when the pressurized fluid is directed through the holes 36 of the jet ignition insert 34, the seal ensures that the pressurized fluid does not escape therebetween, which ensures that the desired fluid pressure is maintained through the jet ignition insert 34 during the flow of the pressurized fluid.

The holes 36 of the jet ignition insert 34 are disposed around the end wall 44. In certain configurations, the holes 36 may include a first set of holes 88 spaced from each other around the longitudinal axis 32. Generally, each of the first set of holes 88 may be disposed transversely through the protrusion 82 relative to the longitudinal axis 32. More specifically, the first set of holes 88 extend angularly outward away from the longitudinal axis 32 such that a portion of the holes 36 that intersect the face 46 of the end wall 44 are disposed farther away from the longitudinal axis 32 than a portion of the holes 36 that intersect the end wall 44 inside 50 of the jet ignition insert 34. Therefore, generally, the first set of holes 88 each extend angularly outwardly away from the opening 42 through the end wall 44 to present a first angular orientation $\Theta_1$, respectively, as best shown in FIGS. 4 and 5.

In certain configurations, the holes 36 also include a distal end hole 90 disposed along the longitudinal axis 32 (see FIGS. 3 and 4). In this configuration, the distal end hole 90 is surrounded by the first set of holes 88. Therefore, in certain configurations, the distal end hole 90 is disposed coaxial with the longitudinal axis 32. As such, the distal end hole 90 extends linearly relative to the longitudinal axis 32 to present a second angular orientation $\Theta_2$. The pressurized fluid enters each of the first set of holes 88 and the distal end hole 90 during the first operation procedure to flush the debris out of the first set of holes 88 and out of the distal end hole 90 of the end wall 44. It is to be appreciated that the diameter of the distal end hole 90 may be the same as the diameter of the first set of holes 88, or in other configurations, the diameter of the distal end hole 90 may be different than the diameter of the first set of holes 88.

In certain configurations, the end wall 44, and specifically, the face 46, may optionally define a recess 92 (see FIGS. 3 and 4). Therefore, in certain configurations, the protrusion 82 may define the recess 92. The recess 92 may be disposed along the longitudinal axis 32, and thus, the first set of holes 88 may surround the recess 92. The recess 92 is a different configuration from the distal end hole 90. The distal end hole 90 is disposed between the recess 92 and the opening 42 such that the distal end hole 90 fluidly connects the recess 92 and the opening 42. Generally, the recess 92 is larger than the distal end hole 90. For example, a radius $r_1$ of the recess 92 is larger than a radius $r_2$ of the distal end hole 90. The pressurized fluid enters the recess 92, each of the first set of holes 88, and the distal end hole 90 during the first operation procedure to flush the debris out of the recess 92, the first set of holes 88, and out of the distal end hole 90 of the end wall 44.

During the first operation procedure, the pressurized fluid is forced into the jet ignition insert 34, and thus, pushes any debris into the opening 42 inside 50 of the jet ignition insert 34. In other words, the first operation procedure directs the debris toward the pre-combustion chamber, and thus, toward the spark plug well 24. Therefore, it is desirable to also clean the inside 50 of the jet ignition insert 34 and the pre-combustion chamber, in which case the second operation procedure is performed.

Figure 7:
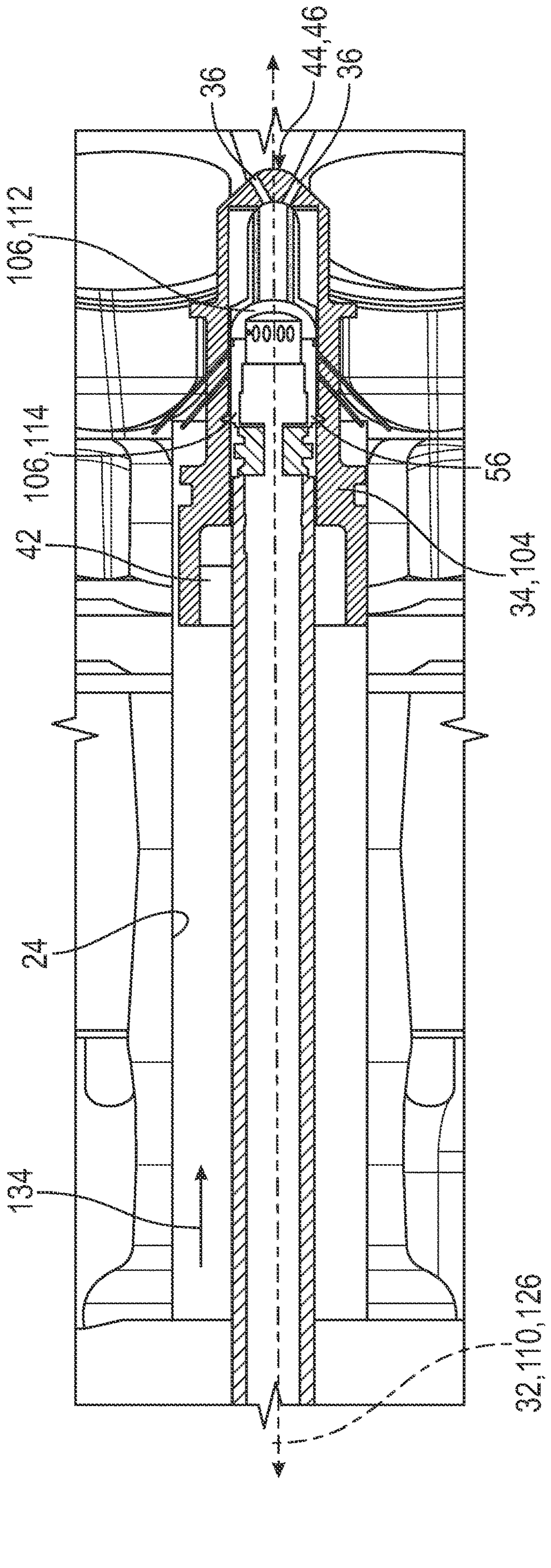
FIG. 7 is a schematic cross-sectional view of the cylinder head and the second tool attachment disposed in a starting position, and projecting a spray pattern.
Figure 10:
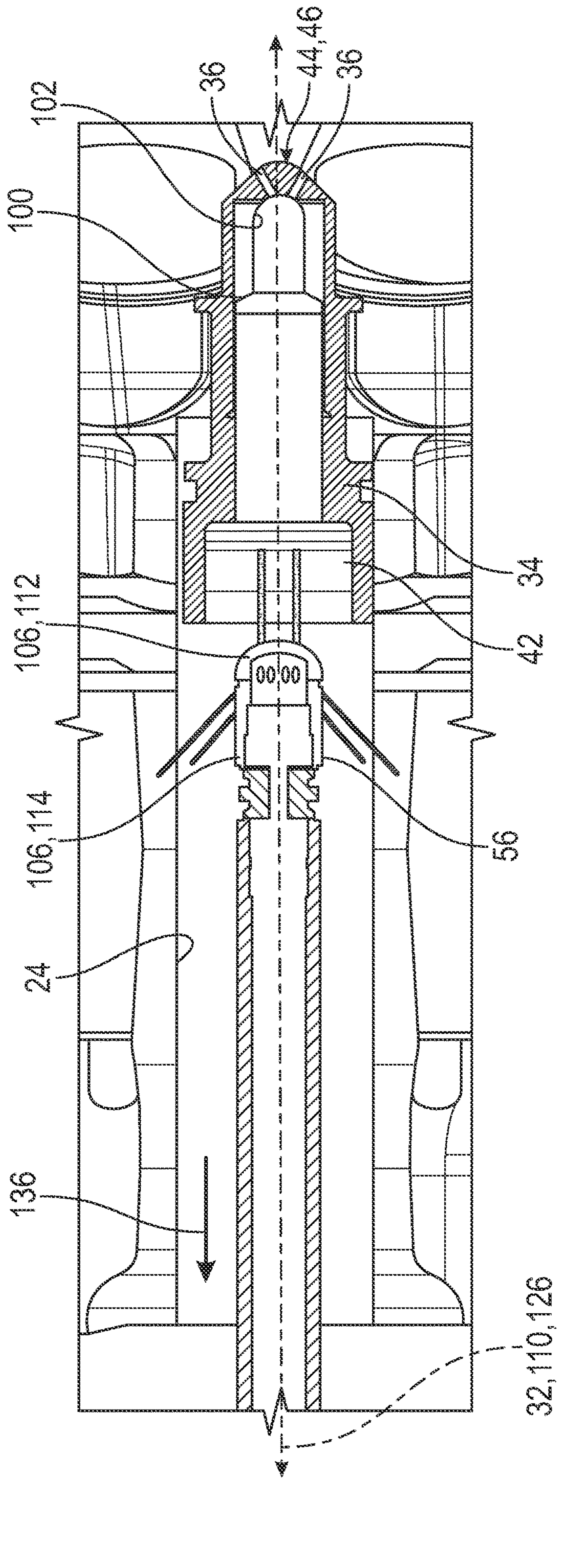
FIG. 10 is a schematic cross-sectional view of the cylinder head and the second tool attachment moving to a final position, and projecting a spray pattern.

Therefore, next, some additional features of the inside 50 of the jet ignition insert 34 are discussed. Turning to FIGS. 5, 7, and 10, the jet ignition insert 34 includes an inner wall 94 defining a boundary of the opening 42. In certain configurations, the opening 42 of the jet ignition insert 34 may include a first portion 96 having a first diameter $ID_1$ and a second portion 98 having a second diameter $ID_2$ less than the first diameter $ID_1$ of the first portion 96. Therefore, the opening 42 may have a stepped configuration. The second portion 98 may be disposed between the first portion 96 and the holes 36 such that the second portion 98 fluidly connects the first portion 96 of the opening 42 and the holes 36. As mentioned above, the opening 42 may be stepped, and therefore, the inner wall 94 of the jet ignition insert 34 may include a step 100 between the first portion 96 and the second portion 98 of the opening 42. In certain configurations, the step 100 tapers inwardly toward the longitudinal axis 32 as the step 100 extends from the first portion 96 toward the second portion 98 to present a third angular orientation $\Theta_3$. The step 100 may be orientated in this way to prevent the debris from being caught between the first portion 96 and the second portion 98 of the opening 42. The pressurized fluid enters the holes 36 during the first operation procedure to flush the debris out of the holes 36, through the second portion 98 of the opening 42 and toward the first portion 96 of the opening 42.

The inner wall 94 of the jet ignition insert 34 along the second portion 98 of the opening 42 may include a taper 102 adjacent to an end of the second portion 98 proximal to the end wall 44. The taper 102 may form a dome inside 50 of the jet ignition insert 34 at the end of the second portion 98 proximal to the end wall 44. The holes 36 may intersect the taper 102 of the inner wall 94. In certain configurations, the taper 102 tapers inwardly toward the longitudinal axis 32 as the taper 102 extends from the second portion 98 toward the end wall 44 to present a fourth angular orientation $\Theta_4$. Therefore, this fourth angular orientation may form the dome inside 50 of the end wall 44. The pressurized fluid has a predetermined amount of fluid pressure to enter each of the first set of holes 88 and the distal end hole 90 in the first and second angular orientations during the first operation procedure to flush the debris out of the first set of holes 88 and out of the distal end hole 90 past the taper 102 of the second portion 98 of the opening 42 and toward the first portion 96 of the opening 42.

Generally, the second tool attachment 56 is configured to be inserted into the spark plug well 24 and into the opening 42 of the jet ignition insert 34. Therefore, the second tool attachment 56 has an outer diameter $OD_1$ less than an outer diameter $OD_2$ of the second well portion 30 of the spark plug well 24 and less than the inner diameter $ID_1$ of the opening 42 of the jet ignition insert 34 such that the second tool attachment 56 is insertable into the opening 42 through the spark plug well 24 to perform the second operation procedure. The first well portion 28 of the spark plug well 24 may have an outer diameter $OD_4$ greater than the outer diameter $OD_2$ of the second well portion 30.

The second tool attachment 56 includes a second tool housing 104 having an end cap 106. The second tool housing 104 defines a cavity 108 along a second central axis 110, and the end cap 106 of the second tool housing 104 closes one end of the cavity 108. The end cap 106 may include an end portion 112 that the second central axis 110 intersects and a side portion 114 that surrounds the second central axis 110. Therefore, the side portion 114 and the end portion 112 cooperate to define a boundary of the cavity 108.

In certain configurations, the end cap 106 defines a plurality of apertures 116 in fluid communication with the cavity 108 (see FIGS. 11-25). The pressurized fluid is directed through the apertures 116 and into the opening 42 of the jet ignition insert 34 during the second operation procedure of the tooling assembly 10. Depending on the location of the apertures 116 and/or the configuration of the apertures 116, different spray patterns may be obtained when the pressurized fluid is directed out of the apertures 116. It is to be appreciated that FIGS. 14, 15, 19, 20, 24, and 25 illustrate the spray patterns created when the pressurized fluid exits the apertures 116 at different locations and configurations of the apertures 116. Also, FIGS. 7 and 10 illustrate one spray pattern example, but it is to be appreciated that any of the spray patterns/location and configuration of the apertures 116 illustrated in FIGS. 11-25 may be disposed in FIGS. 7 and 10. The spray patterns illustrated in the figures are shown as speckling for illustrative purposes. Also, with regards to FIG. 7, the spray pattern would be difficult to see due to the close proximity of the second tool attachment 56 relative to the inside 50 of the jet ignition insert 34 and/or relative to the inside of the spark plug well 24, and therefore, the spray pattern is shown outside of these features to illustrate the angle of the spray pattern relative to the inside 50 of the jet ignition insert 34 and/or relative to the inside of the spark plug well 24. It is to be appreciated that in practical application, the pressurized fluid sprayed inside of the jet ignition insert 34 and/or inside of the spark plug well 24 will remain inside thereof even though FIGS. 7 and 10 illustrate a portion of the spray pattern going beyond the inside walls of the jet ignition insert 34 and/or the spark plug well 24.

Figure 19:
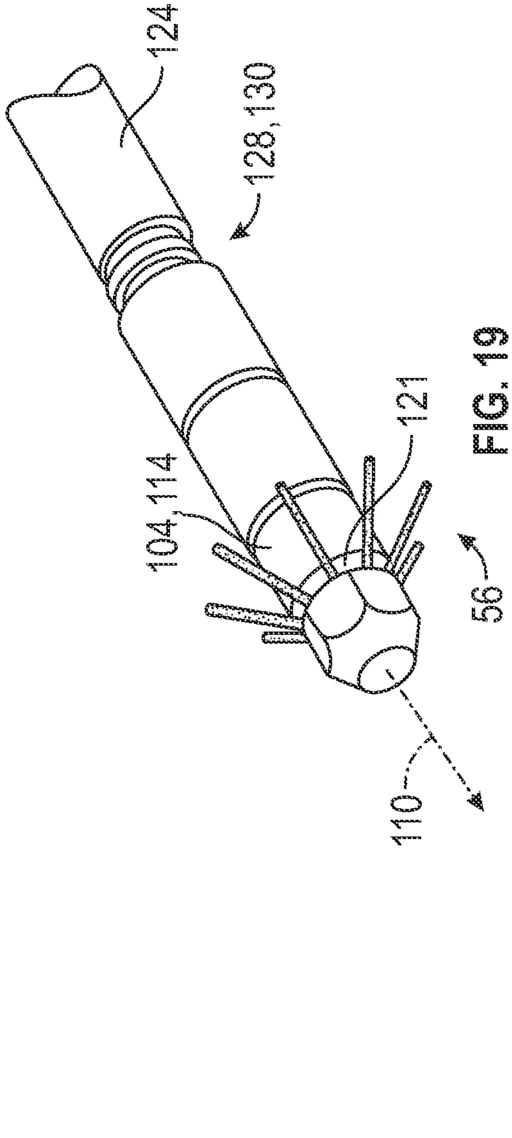
FIG. 19 is a schematic perspective view of the second tool attachment of FIG. 16 with the spray pattern illustrated.
Figure 20:
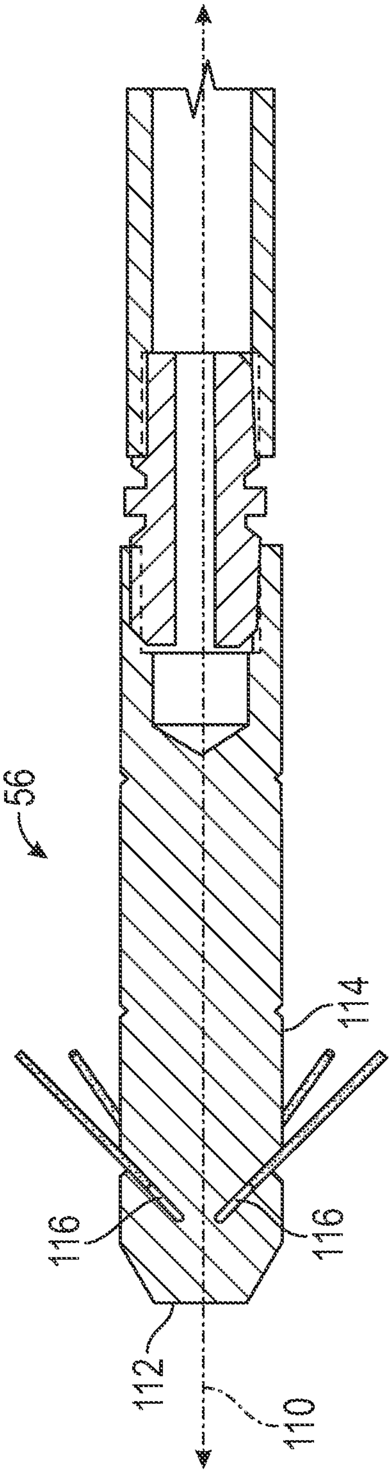
FIG. 20 is a schematic cross-sectional view of the second tool attachment of FIG. 16 with the spray pattern illustrated.
Figure 21:
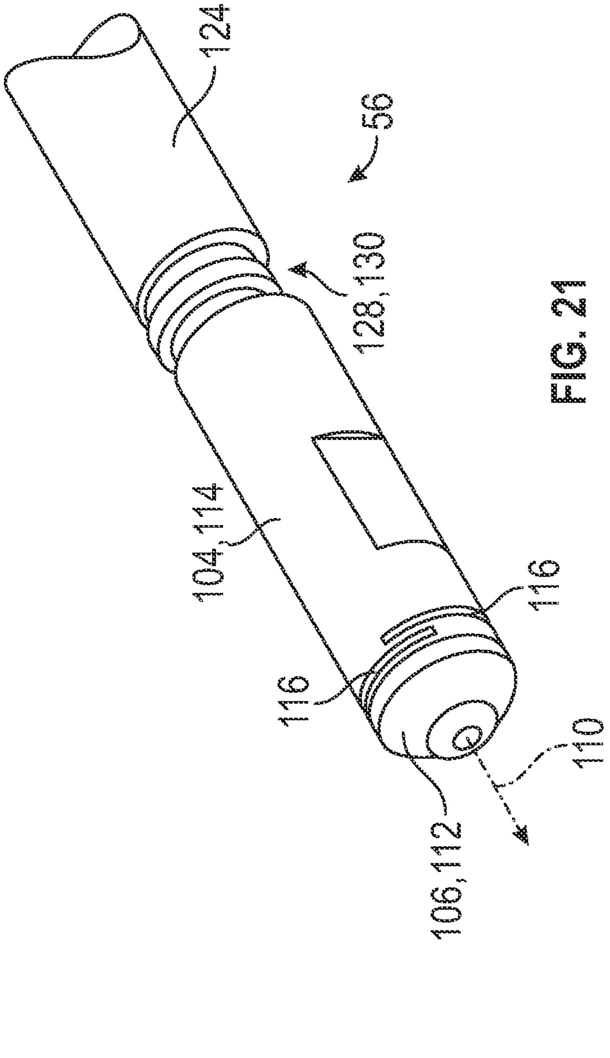
FIG. 21 is a schematic perspective view of the second tool attachment defining apertures in another configuration to form yet another spray pattern.
Figure 22:
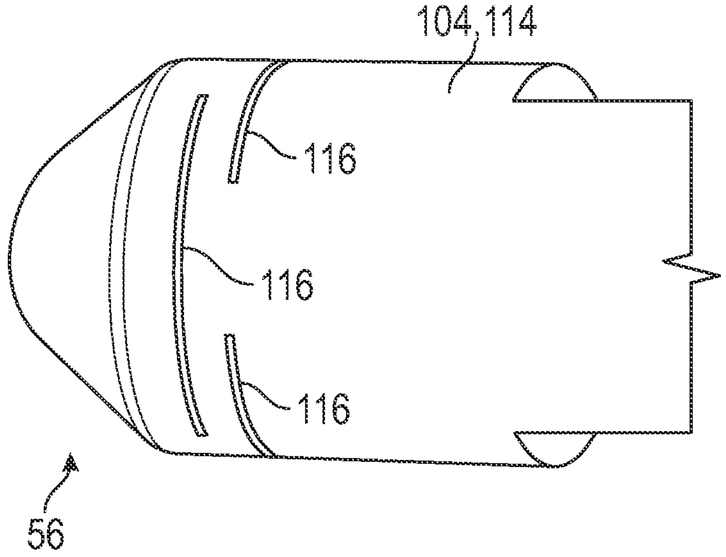
FIG. 22 is another schematic perspective view of the second tool attachment of FIG. 21.
Figure 23:
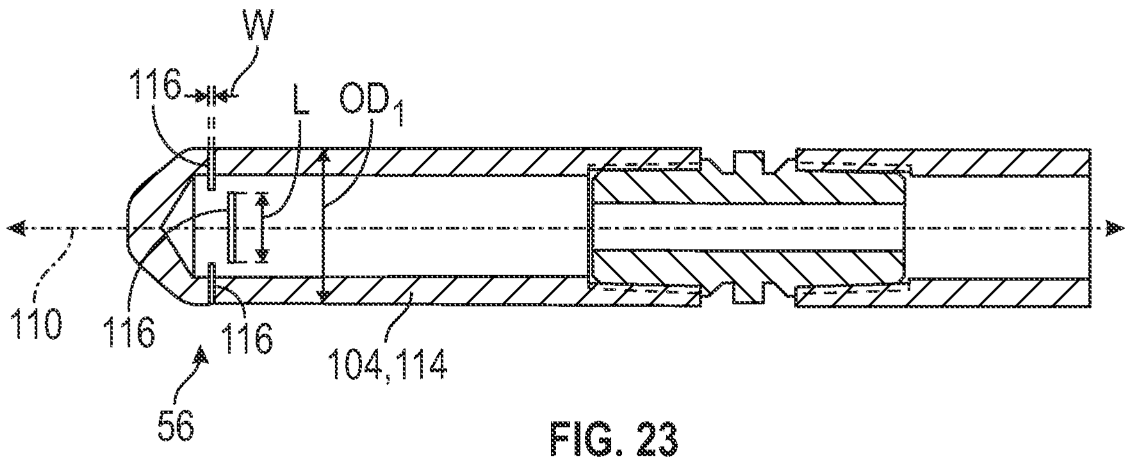
FIG. 23 is a schematic cross-sectional view of the second tool attachment of FIG. 21.
Figure 24:
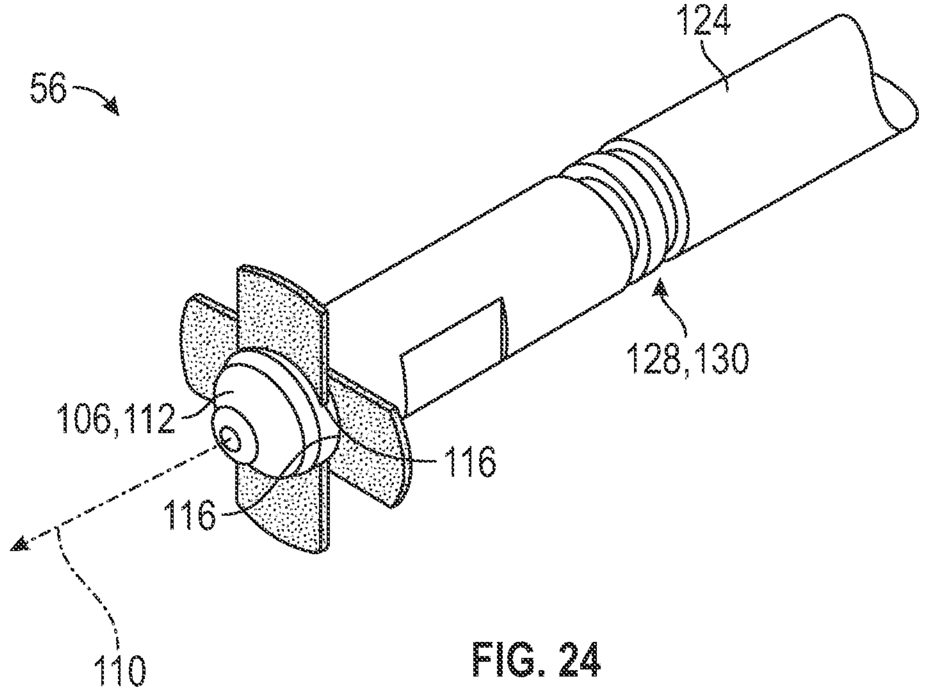
FIG. 24 is a schematic perspective view of the second tool attachment of FIG. 21 with the spray pattern illustrated.
Figure 25:
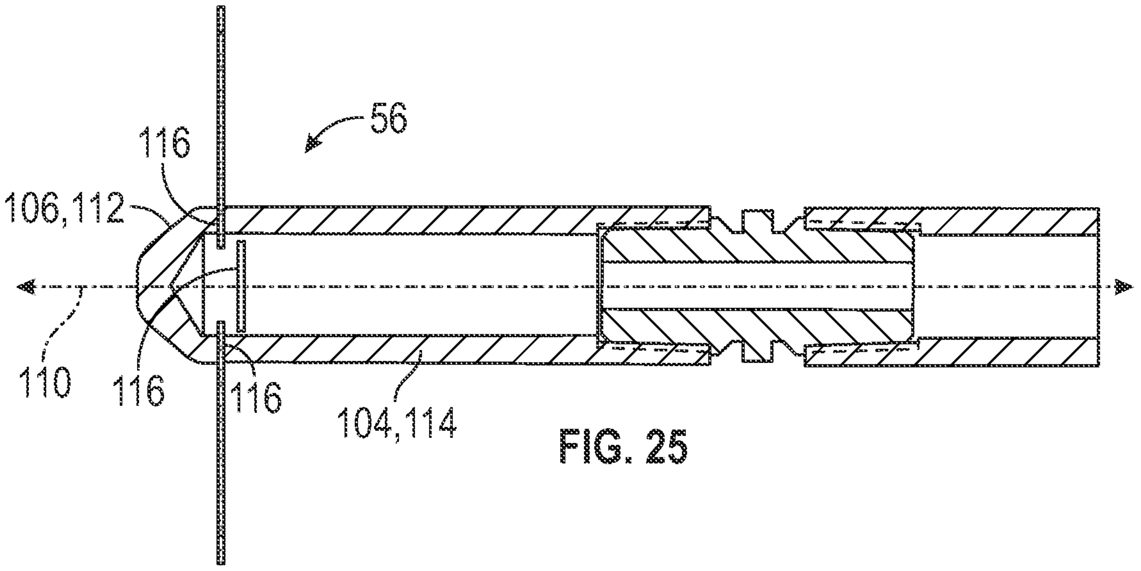
FIG. 25 is a schematic cross-sectional view of the second tool attachment of FIG. 21 with the spray pattern illustrated.

For example, referring to FIGS. 11-13, 16-18, and 21-23, the side portion 114 defines the apertures 116 spaced from each other around the second central axis 110. In certain configurations, the apertures 116 are disposed through the side portion 114 of the second tool attachment 56 and not the end portion 112 (see FIGS. 16-18 and 21-23). In this configuration, depending on the angle of the apertures 116, the spray pattern may be perpendicular to the longitudinal axis 32 (see FIGS. 24 and 25) and/or angled transverse relative to the longitudinal axis 32 (see FIGS. 19 and 20). FIGS. 19 and 20 illustrates the spray pattern being angled back away from the end portion 112.

Figure 11:
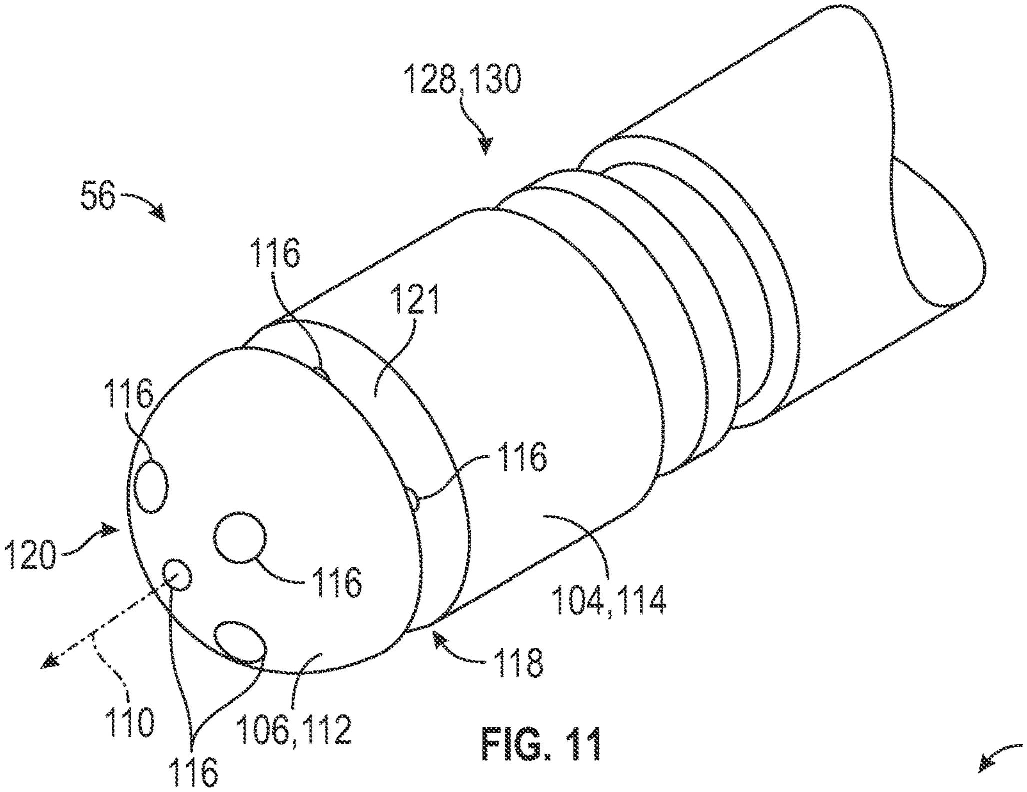
FIG. 11 is a schematic perspective view of the second tool attachment defining apertures that form one spray pattern.
Figure 12:
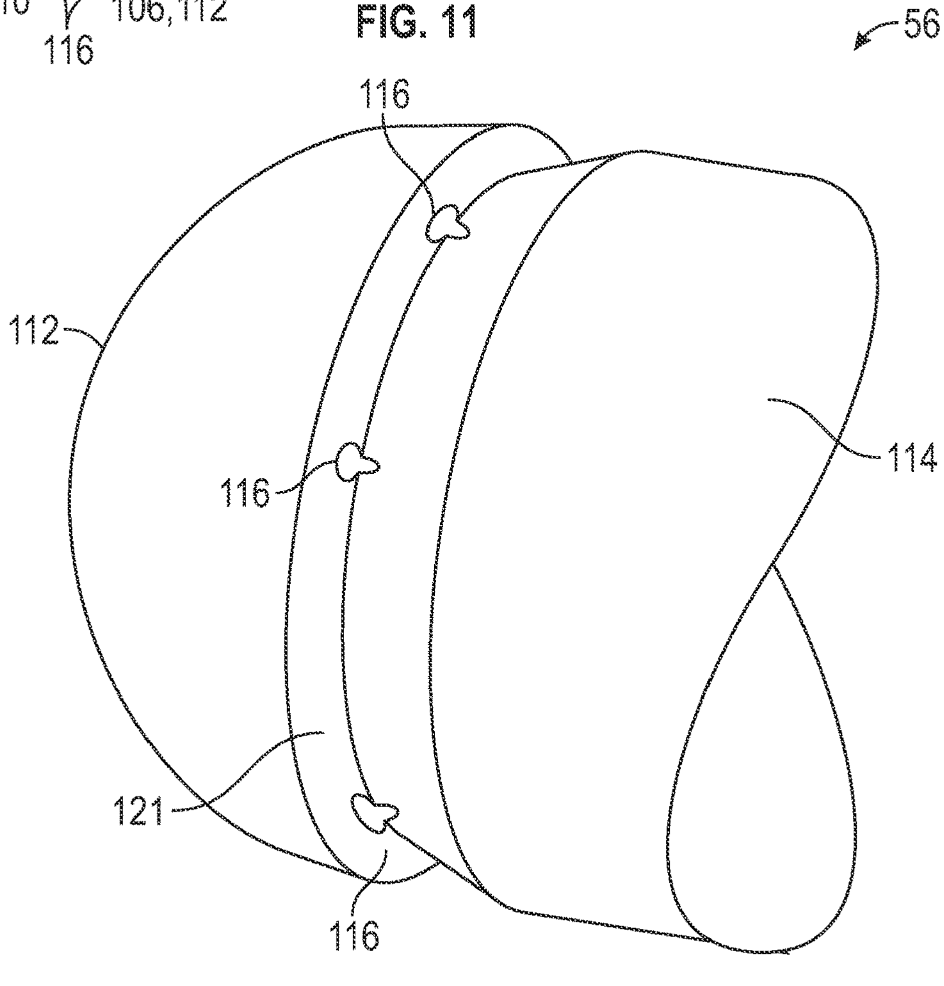
FIG. 12 is another schematic perspective view of the second tool attachment of FIG. 11.
Figure 14:
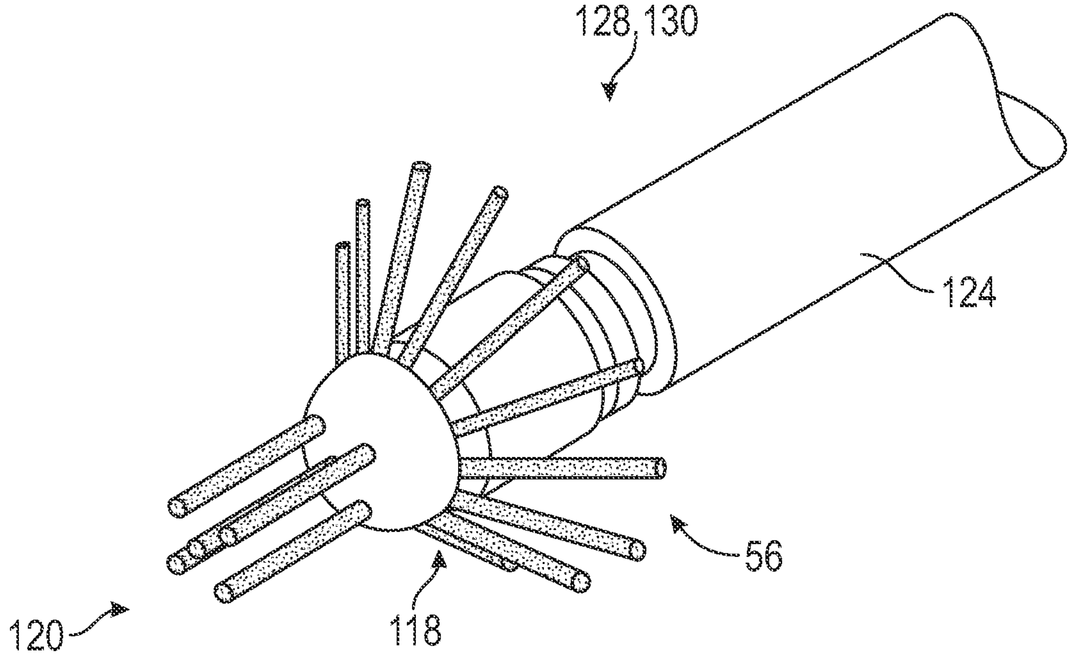
FIG. 14 is a schematic perspective view of the second tool attachment of FIG. 11 with the spray pattern illustrated.
Figure 15:
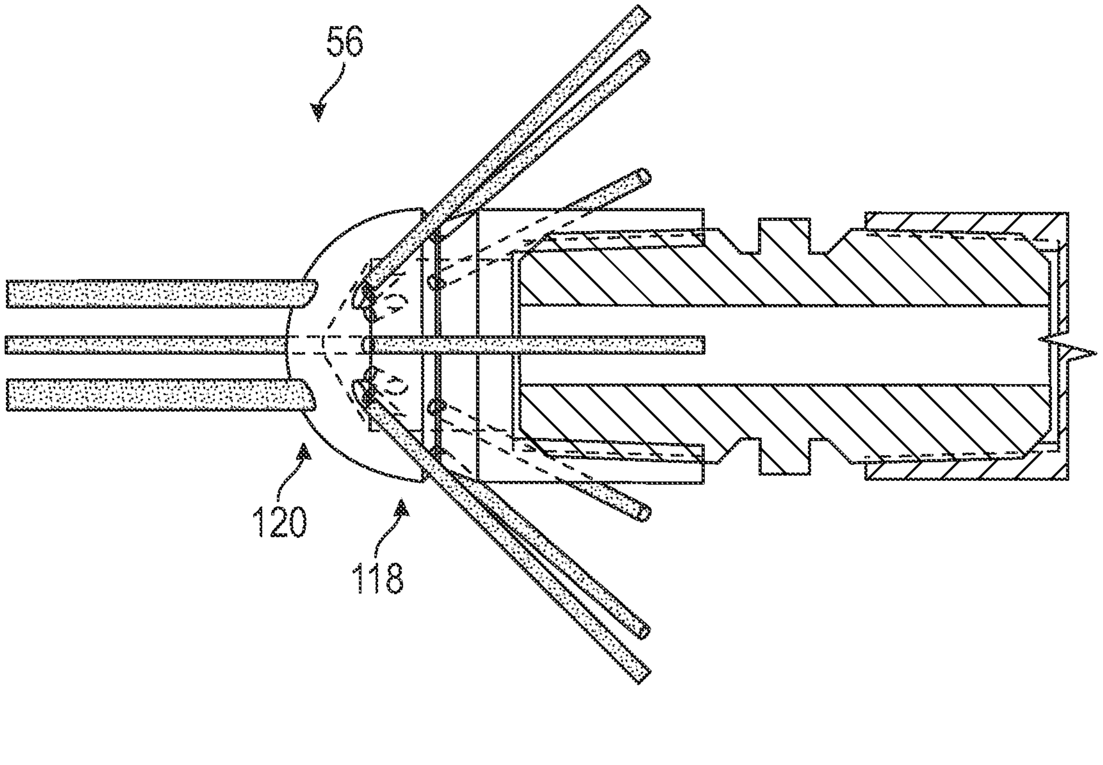
FIG. 15 is a schematic cross-sectional view of the second tool attachment of FIG. 11 with the spray pattern illustrated.
Figure 16:
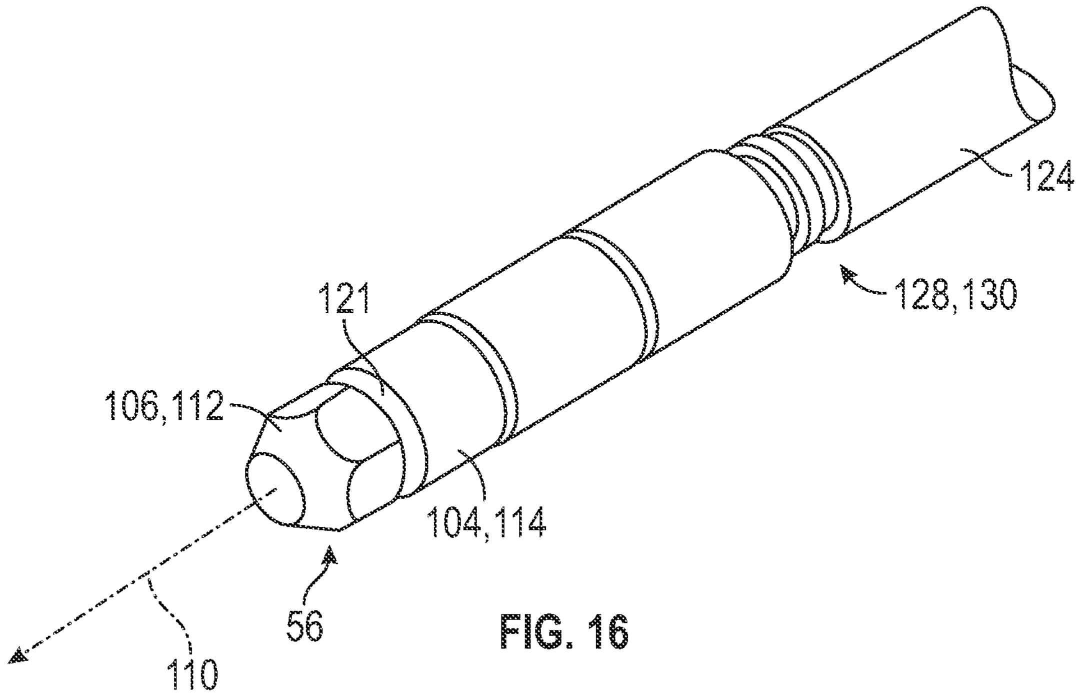
FIG. 16 is a schematic perspective view of the second tool attachment defining apertures in another configuration to form another spray pattern.
Figure 17:
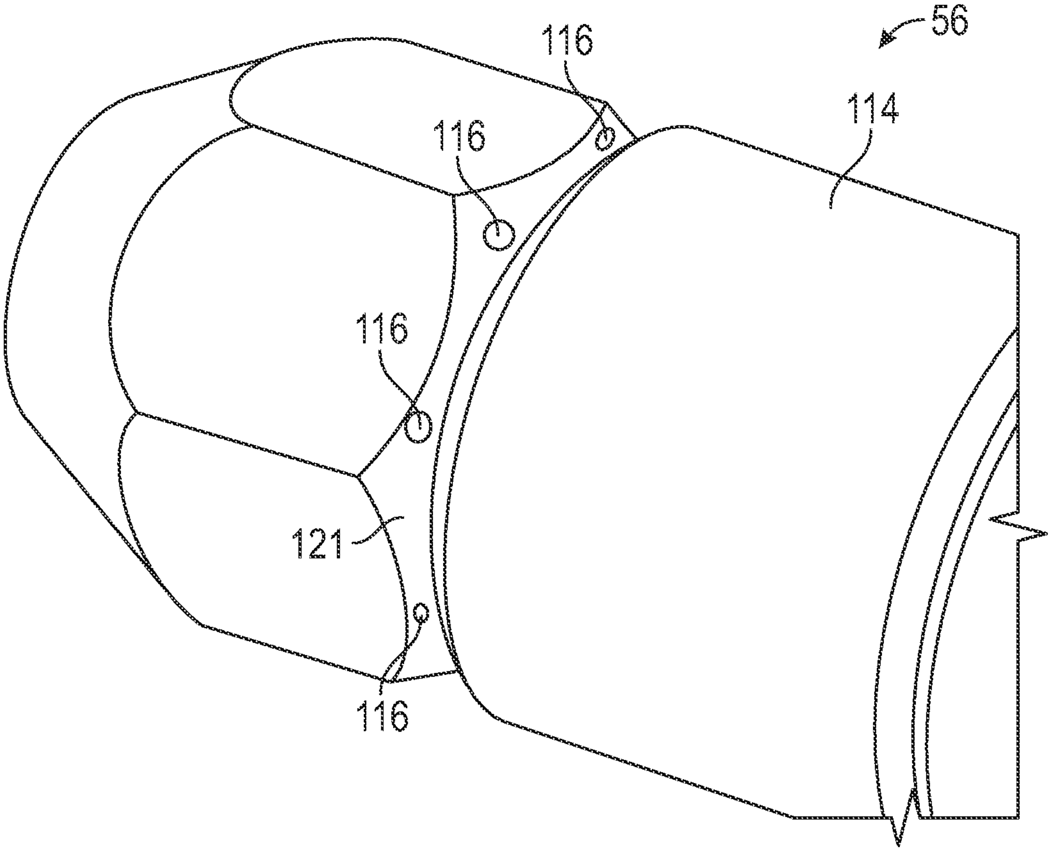
FIG. 17 is another schematic perspective view of the second tool attachment of FIG. 16.
Figure 18:
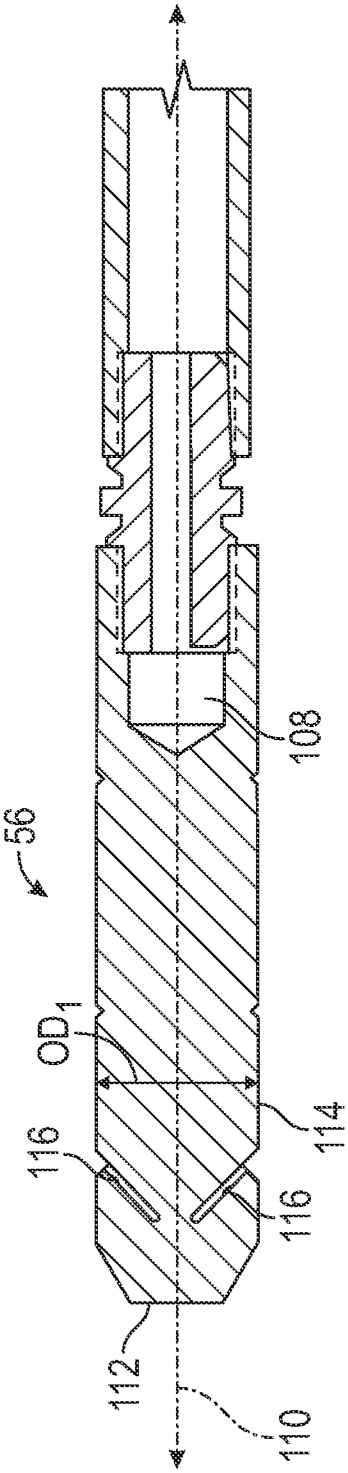
FIG. 18 is a schematic cross-sectional view of the second tool attachment of FIG. 16.

In other configurations, the second tool attachment 56 has apertures 116 disposed through the side portion 114 and disposed at other locations (see FIGS. 7, 10, and 11-15). For example, in certain configurations, the apertures 116 include a first set of apertures 118 disposed through the side portion 114 and the apertures 116 include a second set of apertures 120 disposed through the end portion 112. In this configuration, each of the first set of apertures 118 may be spaced from each other around the second central axis 110. Also, in this configuration, the second set of apertures 120 may be spaced from each other around the second central axis 110. Therefore, in this configuration, the first set of apertures 118 may surround the second set of apertures 120. In certain configurations, each of the first set of apertures 118 may be disposed transversely through the side portion 114 relative to the second central axis 110, and each of the second set of apertures 120 may be disposed substantially parallel to the second central axis 110. Therefore, the spray pattern of this configuration may provide two different directions of spray. As best shown in FIGS. 7 and 10, the pressurized fluid that exits the first set of apertures 118 is directed at the first portion 96 of the opening 42, while the pressurized fluid that exits the second set of apertures 120 is directed at the end wall 44 inside 50 of the second portion 98 of the opening 42. As shown in FIGS. 11 and 14, one of the apertures 116 through the end portion 112 may be disposed coaxial with the central axis 110, but the aperture 116 coaxial with the central axis 110 is optional, and therefore, may be removed.

Turning the apertures 116 disposed around the side portion 114 of the second tool attachment 56 of FIGS. 13, 14, 18, and 19, the apertures 116 are angled to direct the spray pattern back away from the end portion 112. To assist in directing the spray pattern in this manner, the side portion 114 may define a groove 121 that surrounds the second central axis 110, and the apertures 116 may intersect the side portion 114 within the groove 121. The groove 121 may be an arcuate configuration or any other suitable configuration.

In yet other configurations, the size of the apertures 116 may be changed. For example, as shown in FIGS. 22-25, each of the apertures 116 may be elongated radially around the second central axis 110 to define elongated narrow slots 122 around the side portion 114. In other words, a length Lof the apertures 116 may be greater than a width W of the apertures 116, to define the elongated narrow slots 122. Therefore, the spray pattern out of each of the apertures 116 for this configuration is wider than the spray pattern out of each of the apertures 116 having smaller apertures 116, such as FIGS. 11-20. It is to be appreciated that another set of apertures 118, 120 may be disposed through the end portion 112 of the end cap 106 for FIGS. 22-25, and this another set of apertures 118, 120 may be elongated narrow slots 122 or the apertures 116 may be configured similarly to FIGS. 11-20, i.e., smaller apertures 116 than the slots of FIGS. 22-25.

In various configurations, the shape or configuration of the apertures 116 may be changed. For example, the apertures 116 may be circular, square, triangular, rectangular, oval shaped, star shaped, polygon shaped, etc. Therefore, any of the locations of the apertures 116 and the configurations of the apertures 116 as described herein, and shown in the figures, may be mixed together in any desired combination. For example, one or more apertures 116 may be circular, one or more apertures 116 may be elongated, one or more apertures 116 may be square, and any of the apertures 116 may be disposed around the side portion 114 and/or the end portion 112 of the end cap 106.

As mentioned above, the tool 16 may be configured with the first tool attachment 54, and the tool 16 may be configured with the second tool attachment 56. Referring to FIG. 1, the tool 16 may include a wand 124 extending along a tool axis 126 to provide additional length of the tool 16 to perform the first operation procedure and the second operation procedure. The wand 124 may be attached to the tool chuck 60 and the pressurized fluid may be guided through the wand 124 to the first tool attachment 54 and the second tool attachment 56. An end of the wand 124 may include a connection point 128 to interchange the first tool attachment 54 and the second tool attachment 56. Therefore, one wand 124 may be used for the different tool attachments 54, 56. The connection point 128 may be any suitable configuration to attach the first tool attachment 54 and the second tool attachment 56 to the wand 124. Therefore, the first tool attachment 54 and the second tool attachment 56 may include a mating connection point 130. For example, the wand 124 and the tool attachments 54, 56 may include a quick connect fitting, threaded with mating features, etc.

Alternatively, a plurality of the wands 124 may be used, such that one wand 124 supports the first tool attachment 54 and other wand 124 supports the second tool attachment 56. In this configuration, the wand 124 having the first tool attachment 54 may be a subassembly that is selectively attached to the tool chuck 60 as a unit, and the wand 124 having the second tool attachment 56 may be a subassembly that is selectively attached to the tool chuck 60 as a unit.

The wand 124 may be any suitable configuration, and a couple non-limiting examples are that the wand 124 and the first tool attachment 54 are linear or straight relative to each other, or alternatively, the first tool attachment 54 may be disposed transverse to a portion of the wand 124. Therefore, for example, the wand 124 may extend linearly along the tool axis 126 such that the tool axis 126 and the first central axis 74 are coaxial relative to each other, or the wand 124 may include a transverse portion or bend such that the first central axis 74 is transverse to the tool axis 126. In certain configurations, the transverse portion of the wand 124 may turn the first tool attachment 54 to about 90 degrees relative to the tool axis 126.

The present disclosure also provides a method of cleaning the cylinder head 12 using pressurized fluid. Again, as discussed above, it is desirable to remove any debris left on the jet ignition insert 34 after machining the holes 36 and the optional recess 92. As such, the below method describes some of the steps 100 to clean the jet ignition insert 34. It is to be appreciated that the order or sequence of performing the method as discussed below is for illustrative purposes and other orders or sequences are within the scope of the present teachings. It is to also be appreciated that the method may include other features or steps 100 not specifically discussed below, which, for example, may have been discussed above.

The part cleaning machine 14 may be programmed to clean the part, which in this case, may be the cylinder head 12, and specifically the jet ignition insert 34. The cylinder head 12 may be disposed in the desired orientation to perform the first operation procedure, which is to clean the jet ignition insert 34 from the outside 48 of the cylinder head 12. That is, the first operation procedure is to flush the holes 36 of the jet ignition insert 34 from the direction of the face 46 of the end wall 44.

The first tool attachment 54 is attached to the tool 16 to perform the first operation procedure. The first engagement surface 52 of the jet ignition insert 34 and the second engagement surface 78 of the first tool attachment 54 are abutted together to form the seal therebetween during the first operation procedure. Therefore, the first tool attachment 54 may be positioned to align and move forward toward the jet ignition insert 34 to abut the jet ignition insert 34 and when the first operation procedure is complete, move away from the jet ignition insert 34 (see directional arrow 132 in FIG. 5). It is to be appreciated that the part holder 58 and/or the tool 16 may move to create the abutting relationship between the jet ignition insert 34 and the tool 16, and thus, the direction of movement may be different in certain applications. In certain configurations, abutting together the first engagement surface 52 and the second engagement surface 78 may include aligning the second engagement surface 78 of the first tool attachment 54 with the first engagement surface 52 of the jet ignition insert 34 from outside 48 of one side of the body 18 to perform the first operation procedure. As discussed above, the jet ignition insert 34 caps the end of the spark plug well 24, and the features of the jet ignition insert 34 are discussed above and will not be repeated below.

The flow of the pressurized fluid is directed through the tool 16 and through the holes 36 of the end wall 44 of the jet ignition insert 34 to flush the debris out of the holes 36 of the end wall 44 and toward the opening 42 of the jet ignition insert 34 during the first operation procedure. After a predetermined amount of time of flushing, the flow of the pressurized fluid is stopped and then the tool 16 is retracted away from the jet ignition insert 34 to complete the first operation procedure. The first tool attachment 54 may be removed from the tool 16 when the first operation procedure is complete.

Optionally, a vacuum may be placed in or over the spark plug well 24 along the other side of the cylinder head 12 during the first operation procedure. The vacuum may be used to vacuum or extract the fluid and/or the debris out of the spark plug well 24, or more specifically, out of the opening 42 of the jet ignition insert 34 and/or the pre-combustion chamber, as the flow of the pressurized fluid is directed through the holes 36 of the end wall 44 during the first operation procedure. That is, as the pressurized fluid enters the opening 42 of the jet ignition insert 34 through the holes 36 of the end wall 44, the vacuum may draw the fluid and/or the debris out of the opening 42 and out of the spark plug well 24.

It is desirable to apply a certain amount of fluid pressure in order to expel the debris from the jet ignition insert 34. Therefore, the flow of the pressurized fluid directed through the first tool attachment 54 includes the flow of the pressurized fluid at about 250 PSI and at about 55 GPM out of the first tool attachment 54 to flush the debris out of the holes 36 of the jet ignition insert 34. It is to be appreciated that other fluid pressures may be used.

In addition, the part cleaning machine 14 may be programmed to provide the desired amount of flow of the pressurized fluid. For example, the part cleaning machine 14 may continuously apply the pressurized fluid, such as water, for the first operation procedure. As another example, the part cleaning machine 14 may pulse the pressurized fluid for the first operation procedure. As yet another example, the part cleaning machine 14 may alternate air and a liquid fluid, such as water, for the first operation procedure.

Next, the part cleaning machine 14 will perform the second operation procedure. The part cleaning machine 14 may reorientates the cylinder head 12 relative to the tool 16 or the tool 16 may move to the other side of the cylinder head 12. Regardless of the way the cylinder head 12 and/or the tool 16 are reorientated, the other side of the cylinder head 12 is accessed to perform the second operation procedure. In other words, the jet ignition insert 34 is accessed from inside 50 of the spark plug well 24.

The second tool attachment 56 is attached to the tool 16 to perform the second operation procedure. The second tool attachment 56 is inserted in a first direction (see arrow 134 in FIG. 7) inside 50 of the spark plug well 24 and into the first portion 96 of the opening 42 of the jet ignition insert 34 until an end of the second tool attachment 56 is disposed proximal to the second portion 98 of the opening 42 of the jet ignition insert 34 during the second operation procedure, and more specifically, until the end cap 106 (which includes the end) is disposed proximal to the second portion 98 of the opening 42 of the jet ignition insert 34 during the second operation procedure. That is, in certain configurations, the end cap 106 may include the end of the second tool attachment 56. In certain configurations, inserting the second tool attachment 56 in the first direction 134 may include inserting the second tool attachment 56 into the opening 42 of the jet ignition insert 34 via the spark plug well 24 from the other side of the body 18 to perform the second operation procedure. The second tool attachment 56 moves in the first direction 134 until a starting position (see FIG. 7) is reached. In certain configurations, the starting position is where the end portion 112 of the end cap 106 is disposed adjacent to the step 100 of the jet ignition insert 34. Generally, the second tool attachment 56 moves to the starting position before starting the flow of the pressurized fluid.

Once the second tool attachment 56 is in the starting position, the part cleaning machine 14 starts the flow of the pressurized fluid. The flow of the pressurized fluid is directed through the second tool attachment 56 of the tool 16 and into the opening 42 of the jet ignition insert 34 during the second operation procedure. The tool 16 may remain at the starting position for a predetermined amount of time, or the tool 16 may start moving out of the jet ignition insert 34 when the flow begins. The second tool attachment 56 moves in a second direction (see arrow 136 in FIG. 10) outwardly away from the jet ignition insert 34 through the spark plug well 24 as the flow of the pressurized fluid is directed through the tool 16 to flush the debris out of the opening 42 of the jet ignition insert 34 and out of the spark plug well 24 during the second operation procedure. Therefore, the second direction 136 is opposite the first direction 134.

It is desirable to apply a certain amount of fluid pressure in order to expel the debris from the jet ignition insert 34. Therefore, the flow of the pressurized fluid directed through the second tool attachment 56 includes the flow of the pressurized fluid at about 250 PSI and at about 55 GPM out of the second tool attachment 56 to flush the debris out of the opening 42 of the jet ignition insert 34. It is to be appreciated that other fluid pressures may be used.

In addition, the part cleaning machine 14 may be programmed to provide the desired amount of flow of the pressurized fluid. For example, the part cleaning machine 14 may continuously apply the pressurized fluid, such as water, for the second operation procedure. As another example, the part cleaning machine 14 may pulse the pressurized fluid for the second operation procedure. As yet another example, the part cleaning machine 14 may alternate air and a liquid fluid, such as water, for the second operation procedure.

Generally, the flow of the pressurized fluid directed through the second tool attachment 56 includes spraying the pressurized fluid out of the second tool attachment 56 in a spray pattern to flush the debris out of the opening 42 of the jet ignition insert 34. Different spray patterns may be produced depending on the location and configuration of the apertures 116. Non-limiting examples of the location and configuration of the apertures 116 may be found in FIGS. 11-25.

Referring to FIGS. 11-25, the apertures 116 may be defined through the side portion 114 of the end cap 106. In certain configurations, the apertures 116 may be defined through the side portion 114 and not the end portion 112 as shown in FIGS. 16-25. Therefore, in the configuration of FIGS. 16-20, the flow of the pressurized fluid in the spray pattern may include the flow of the pressurized fluid out of the apertures 116 defined through the side portion 114 of the end cap 106 to define a first spray pattern in which the pressurized fluid is directed angularly away from the end wall 44 to direct the debris out of the jet ignition insert 34.

Turning to FIGS. 11-15, the apertures 116 may be defined through the side portion 114 and the end portion 112 of the end cap 106. Therefore, directing the flow of the pressurized fluid in the spray pattern may include directing the flow of the pressurized fluid out of the first set of the apertures 116 defined through the side portion 114 and the second set of the apertures 116 defined through the end portion 112 to define a second spray pattern in which the pressurized fluid exiting the first set of apertures 118 is directed angularly away from the end wall 44 and the pressurized fluid exiting the second set of apertures 120 is directed toward the end wall 44 to flush the debris out of the opening 42 of the jet ignition insert 34.

Turning to FIGS. 21-25, the apertures 116 may be elongated and defined by the side portion 114. Therefore, directing the flow of the pressurized fluid in the spray pattern may include directing the flow of the pressurized fluid out of the apertures 116 defined the elongated narrow slots 122 disposed radially around the side portion 114 to define a third spray pattern in which the pressurized fluid is directed out linearly perpendicular to an outer surface of the side portion 114. That is, the pressurized fluid is not directed angularly away from the end cap 106, and is instead directed straight outwardly from the end cap 106, substantially perpendicular to the second central axis 110.

The second tool attachment 56 continues to move in the second direction 136 until a final position is reached. The final position may be reached when the end cap 106 is disposed in the spark plug well 24. In certain configurations, the final position may be when the end cap 106 is disposed in the pre-combustion chamber or the second well portion 30. In other configurations, the final position may be when the end cap 106 is disposed in the first well portion 28 of the spark plug well 24. In yet other configurations, the final position may be reached when the end cap 106 is disposed outside 48 of the spark plug well 24 or adjacent to an end of the spark plug well 24 (i.e., adjacent to outside 48 of the spark plug well 24).

When the final position is reached, the flow of the pressurized fluid is stopped and then the tool 16 is retracted away from the jet ignition insert 34 to complete the second operation procedure. The second tool attachment 56 may be removed from the tool 16 when the second operation procedure is complete.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A tooling assembly for cleaning a cylinder head using pressurized fluid, the tooling assembly comprising:

a jet ignition insert attached to a spark plug well defined by the cylinder head, wherein the jet ignition insert includes:

an insert proximal end and an insert distal end, and defines an opening extending between the insert proximal end and the insert distal end, and the opening is in fluid communication with the spark plug well; and an end wall attached to the insert distal end to close one end of the opening, and the end wall includes a face disposed outside of the spark plug well, wherein the end wall defines a plurality of holes in fluid communication with the opening, and the holes intersect the face such that outside of the jet ignition insert is in fluid communication with the opening inside of the jet ignition insert, and wherein the face includes a first engagement surface that surrounds the holes;

a tool configured to clean the jet ignition insert, wherein the tool includes a first tool attachment having a first tool housing that extends between a tool distal end and a tool proximal end relative to a first central axis, wherein the first tool housing defines a through-hole along the first central axis and the through-hole intersects the tool distal end and the tool proximal end to define respective open ends, wherein the tool distal end includes a second engagement surface that surrounds the through-hole; and wherein the first engagement surface of the jet ignition insert and the second engagement surface of the tool engage each other during a first operation procedure of the tooling assembly to form a seal that surrounds the holes of the jet ignition insert such that the pressurized fluid is directed through the holes and into the opening of the jet ignition insert during the first operation procedure of the tooling assembly to flush debris out of the holes of the jet ignition insert.

2. The tooling assembly as set forth in claim 1 wherein the end wall of the jet ignition insert protrudes outwardly away from the spark plug well to define a protrusion, and the first engagement surface surrounds the protrusion, and wherein the holes are defined through the protrusion.

3. The tooling assembly as set forth in claim 2 wherein:

the first tool attachment includes an inner surface defining a boundary of the through-hole, and the inner surface defines a first pocket presenting a space larger than the protrusion;

the second engagement surface of the first tool attachment surrounds the first pocket; and the protrusion is contained inside of the first pocket and spaced apart from the inner surface of the first tool attachment when the first engagement surface of the jet ignition insert and the second engagement surface of the first tool attachment engage each other during the first operation procedure of the tooling assembly.

4. The tooling assembly as set forth in claim 2 wherein:

the opening is disposed along a longitudinal axis; and the holes include a first set of holes spaced from each other around the longitudinal axis, and includes a distal end hole disposed along the longitudinal axis such that the first set of holes surround the distal end hole.

5. The tooling assembly as set forth in claim 4 wherein:

each of the first set of holes are disposed transversely through the protrusion relative to the longitudinal axis;

the distal end hole is disposed coaxial with the longitudinal axis; and the pressurized fluid enters each of the first set of holes and the distal end hole during the first operation procedure to flush the debris out of the first set of holes and out of the distal end hole of the end wall.

6. The tooling assembly as set forth in claim 4 wherein:

the protrusion defines a recess along the longitudinal axis and the first set of holes surround the recess;

the recess is a different configuration from the distal end hole; and the distal end hole is disposed between the recess and the opening such that the distal end hole fluidly connects the recess and the opening.

7. The tooling assembly as set forth in claim 1 wherein:

the jet ignition insert includes an inner wall defining a boundary of the opening, and the opening of the jet ignition insert includes a first portion having a first diameter and a second portion having a second diameter less than the first diameter of the first portion;

the second portion is disposed between the first portion and the holes such that the second portion fluidly connects the first portion of the opening and the holes;

the inner wall of the jet ignition insert includes a step between the first portion and the second portion of the opening; and the pressurized fluid enters the holes during the first operation procedure to flush the debris out of the holes, through the second portion of the opening and toward the first portion of the opening.

8. The tooling assembly as set forth in claim 7 wherein:

the opening is disposed along a longitudinal axis;

the inner wall of the jet ignition insert along the second portion of the opening includes a taper adjacent to an end of the second portion proximal to the end wall;

the holes intersect the taper of the inner wall;

the holes include a first set of holes spaced from each other around the longitudinal axis, and includes a distal end hole surrounded by the first set of holes;

the first set of holes each extend angularly outwardly away from the opening through the end wall to present a first angular orientation, respectively;

the distal end hole extends linearly relative to the longitudinal axis to present a second angular orientation; and the pressurized fluid has a predetermined amount of fluid pressure to enter each of the first set of holes and the distal end hole in the first and second angular orientations during the first operation procedure to flush the debris out of the first set of holes and out of the distal end hole past the taper of the second portion of the opening and toward the first portion of the opening.

9. The tooling assembly as set forth in claim 1:

further including a body defining at least one inlet passage and at least one outlet passage;

wherein the body defines the spark plug well, and the spark plug well is disposed between the at least one inlet passage and the at least one outlet passage;

wherein the jet ignition insert is fixed to the body to cap the spark plug well;

wherein the first engagement surface of the jet ignition insert faces outwardly away from the spark plug well such that the first engagement surface is exposed outside of the body; and wherein the second engagement surface of the first tool attachment is positioned to align with the first engagement surface of the jet ignition insert outside of the body to perform the first operation procedure.

10. The tooling assembly as set forth in claim 9 wherein:

the tool includes a second tool attachment interchangeable with the first tool attachment, and the second tool attachment performs a second operation procedure of the tooling assembly;

the second tool attachment is configured differently from the first tool attachment; and the second tool attachment has an outer diameter less than an outer diameter of the spark plug well and less than an outer diameter of the opening of the jet ignition insert such that the second tool attachment is insertable into the opening through the spark plug well to perform the second operation procedure.

11. The tooling assembly as set forth in claim 1 wherein:

the tool includes a second tool attachment interchangeable with the first tool attachment, and the second tool attachment performs a second operation procedure of the tooling assembly;

the first tool attachment is formed of a first configuration and the second tool attachment is formed of a second configuration different from the first configuration;

the second tool attachment includes a second tool housing having an end cap;

the second tool housing defines a cavity along a second central axis, and the end cap of the second tool housing closes one end of the cavity; and the end cap defines a plurality of apertures in fluid communication with the cavity, and the pressurized fluid is directed through the apertures and into the opening of the jet ignition insert during the second operation procedure of the tooling assembly.

12. The tooling assembly as set forth in claim 11 wherein:

the end cap includes an end portion that the second central axis intersects and a side portion that surrounds the second central axis; and the side portion defines the apertures spaced from each other around the second central axis.

13. The tooling assembly as set forth in claim 12 wherein:

the apertures include a first set of apertures disposed through the side portion and each of the first set of apertures are spaced from each other around the second central axis; and the apertures include a second set of apertures disposed through the end portion and spaced from each other around the second central axis.

14. The tooling assembly as set forth in claim 13 wherein:

each of the first set of apertures are disposed transversely through the side portion relative to the second central axis; and each of the second set of apertures are disposed substantially parallel to the second central axis.

15. The tooling assembly as set forth in claim 12 wherein each of the apertures are elongated radially around the second central axis to define elongated narrow slots around the side portion.

* * * * *